(12) United States Patent
Ogawa

(10) Patent No.: US 8,972,076 B2
(45) Date of Patent: Mar. 3, 2015

(54) DRIVING ASSISTANCE APPARATUS AND DRIVING ASSISTANCE METHOD

(71) Applicant: Yuki Ogawa, Toyota (JP)

(72) Inventor: Yuki Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 217 days.

(21) Appl. No.: 13/666,308

(22) Filed: Nov. 1, 2012

(65) Prior Publication Data

US 2013/0110316 A1    May 2, 2013

(30) Foreign Application Priority Data

Nov. 1, 2011    (JP) ................................ 2011-240591

(51) Int. Cl.
| | | |
|---|---|---|
| G08G 1/00 | (2006.01) | |
| G08G 1/095 | (2006.01) | |
| G08G 1/096 | (2006.01) | |
| G08G 1/0967 | (2006.01) | |

(Continued)

(52) U.S. Cl.
CPC ...... *G08G 1/096716* (2013.01); *G08G 1/09623* (2013.01); *G08G 1/096725* (2013.01); *G08G 1/096741* (2013.01); *G08G 1/096783* (2013.01); *G08G 1/096* (2013.01); *B60W 2550/22* (2013.01); *B60W 30/18154* (2013.01); *G08G 1/095* (2013.01)
USPC ................ 701/1; 701/70; 701/117; 340/901; 340/905; 340/907; 340/929

(58) Field of Classification Search
None
See application file for complete search history.

(56) References Cited

U.S. PATENT DOCUMENTS

| | | | | |
|---|---|---|---|---|
| 5,940,010 | A * | 8/1999 | Sasaki et al. ................... | 340/901 |
| 2005/0134478 | A1 * | 6/2005 | Mese et al. ..................... | 340/901 |

(Continued)

FOREIGN PATENT DOCUMENTS

| | | |
|---|---|---|
| DE | 199 01 808 A1 | 7/2000 |
| DE | 601 06 794 T2 | 11/2005 |

(Continued)

OTHER PUBLICATIONS

Office Action issued Jan. 17, 2013 in German Application No. 10 2012 219 922.5 (English Translation).

(Continued)

*Primary Examiner* — Calvin Cheung
*Assistant Examiner* — Kevin P Mahne
(74) *Attorney, Agent, or Firm* — Oblon, McClelland, Maier & Neustadt, L.L.P.

(57) ABSTRACT

A driving assistance apparatus that assists driving of a vehicle, includes: a vehicle speed sensor; a communication unit that obtains traffic light information relating to a change in a display condition of a traffic light disposed in an advancement direction of the vehicle; a position calculation unit that calculates relative position information between the vehicle and a traffic light location where the traffic light is disposed; and a passage assistance control unit. The passage assistance control unit detects an operating condition of the vehicle at an intersection location before the traffic light, calculates a corrected vehicle speed on the basis of the operating condition and a current vehicle speed, and determines whether or not the vehicle is permitted to pass through the traffic light location on the basis of the corrected vehicle speed, the relative position information between the vehicle and the traffic light location, and the traffic light information.

20 Claims, 11 Drawing Sheets

(51) Int. Cl.
*G08G 1/0962* (2006.01)
*B60W 30/18* (2012.01)

(56) References Cited

U.S. PATENT DOCUMENTS

| | | | |
|---|---|---|---|
| 2010/0004839 A1* | 1/2010 | Yokoyama et al. | 701/70 |
| 2010/0019933 A1* | 1/2010 | Aono | 340/905 |
| 2010/0305804 A1* | 12/2010 | Taguchi | 701/29 |
| 2011/0029195 A1* | 2/2011 | Yamada et al. | 701/36 |
| 2011/0098898 A1* | 4/2011 | Stahlin et al. | 701/70 |
| 2011/0115646 A1* | 5/2011 | Matsumura | 340/907 |
| 2011/0115647 A1* | 5/2011 | Mukaiyama | 340/907 |
| 2011/0260886 A1* | 10/2011 | Nagura et al. | 340/905 |
| 2012/0169517 A1* | 7/2012 | Cho et al. | 340/932 |

FOREIGN PATENT DOCUMENTS

| | | |
|---|---|---|
| DE | 10 2007 018 075 A1 | 10/2008 |
| DE | 10 2007 043 602 A1 | 3/2009 |
| DE | 10 2008 060 869 A1 | 6/2009 |
| DE | 10 2008 020 728 A1 | 10/2009 |
| JP | 2011-103078 | 5/2011 |

OTHER PUBLICATIONS

English translations nor summaries of of foreign patent documents were provided. Foreign patents were considered only to the extent that they were included in the English translation of the Office action of German application 10 2012 219 922.5.

* cited by examiner

DRIVING ASSISTANCE APPARATUS AND DRIVING ASSISTANCE METHOD

INCORPORATION BY REFERENCE

The disclosure of Japanese Patent Application No. 2011-240591 filed on Nov. 1, 2011 including the specification, drawings and abstract is incorporated herein by reference in its entirety.

BACKGROUND OF THE INVENTION

1. Field of the Invention

The invention relates to a driving assistance apparatus and a driving assistance method.

2. Description of Related Art

Recently, vehicles such as automobiles may be installed with a driving assistance apparatus that assists driving by a driver. Japanese Patent Application Publication No. 2011-103078 (JP-A-2011-103078), for example, describes a driving assistance apparatus that provides travel assistance enabling a vehicle to travel over an intersection appropriately on the basis of a travel condition of the vehicle and a traffic light condition. The driving assistance apparatus described in JP-A-2011-103078 includes: preceding communication vehicle acceleration obtaining means for obtaining an acceleration of a preceding communication vehicle traveling ahead of a host vehicle from the preceding communication vehicle through wireless communication; inter-vehicle vehicle number estimating means for estimating an inter-vehicle vehicle number, i.e. a number of vehicles traveling between the preceding communication vehicle and the host vehicle; traffic light information obtaining means for obtaining a passable light illumination time, which is a remaining time of a passable light display by a traffic light ahead of the host vehicle from a current point in time; host vehicle speed predicting means for predicting a future vehicle speed of the host vehicle on the basis of the acceleration of the preceding communication vehicle obtained by the preceding communication vehicle acceleration obtaining means and the inter-vehicle vehicle number estimated by the inter-vehicle vehicle number estimating means; and passage determining means for determining whether or not the host vehicle is permitted to pass through the traffic light before the passable light illumination time elapses on the basis of the passable light illumination time obtained by the traffic light information obtaining means and the future vehicle speed of the host vehicle predicted by the host vehicle speed predicting means.

The driving assistance apparatus described in JP-A-2011-103078 determines whether or not the host vehicle is permitted to pass through the traffic light on the basis of a relationship between the host vehicle and a preceding vehicle, but it may not be possible to pass through the traffic light appropriately by performing the determination on the basis of the relationship between the host vehicle and a preceding vehicle.

SUMMARY OF THE INVENTION

The invention provides a driving assistance apparatus and a driving assistance method that can assist driving by a driver appropriately.

A first aspect of the invention relates to a driving assistance apparatus that assists driving of a vehicle. The driving assistance apparatus includes: a vehicle speed sensor that detects a vehicle speed of the vehicle; a communication unit that obtains traffic light information relating to a change in a display condition of a traffic light disposed in an advancement direction of the vehicle; a position calculation unit that calculates relative position information between the vehicle and a traffic light location where the traffic light is disposed; and a passage assistance control unit that detects an operating condition of the vehicle at an intersection location before the traffic light, calculates a corrected vehicle speed on the basis of the operating condition and a current vehicle speed detected by the vehicle speed sensor, and determines whether or not the vehicle is permitted to pass through the traffic light location on the basis of the corrected vehicle speed, the relative position information between the vehicle and the traffic light location, and the traffic light information.

The operating condition may include a right/left turn at the intersection location, and, when a right/left turn at the intersection location is detected, the passage assistance control unit may calculate, as the corrected vehicle speed, a vehicle speed obtained by adding a predetermined vehicle speed to the current vehicle speed.

The driving assistance apparatus may further include a steering angle sensor that detects a steering angle of the vehicle, and, when the steering angle during passage through the intersection location equals or exceeds a steering angle threshold, the passage assistance control unit may determine that a right/left turn has been performed at the intersection location.

The operating condition may include a stop at the intersection location, and, when a stop at the intersection location is detected, the passage assistance control unit may calculate, as the corrected vehicle speed, a vehicle speed obtained by adding a predetermined vehicle speed to the current vehicle speed.

When the passage assistance control unit determines that a vehicle speed at the intersection location equals or exceeds a vehicle speed threshold, the passage assistance control unit may calculate the current vehicle speed as the corrected vehicle speed.

The intersection location may include a location where a road forks and a location where a stop line is provided.

The driving assistance apparatus may further include a target vehicle speed notification unit that notifies of a target vehicle speed region. When the passage assistance control unit determines that the vehicle is permitted to pass through the traffic light location, the passage assistance control unit may set a vehicle speed region in which the vehicle is permitted to pass through the traffic light location as the target vehicle speed region, and the target vehicle speed notification unit may notify of the target vehicle speed region determined by the passage assistance control unit.

The passage assistance control unit may determine whether or not the vehicle is permitted to pass through the traffic light location on the basis of at least one of an accelerated corrected vehicle speed generated when the vehicle accelerates from the corrected vehicle speed at an allowable acceleration and a decelerated corrected vehicle speed generated when the vehicle decelerates from the corrected vehicle speed at an allowable deceleration.

The passage assistance control unit may predict an arrival timing at which the vehicle arrives at the traffic light location after traveling at the corrected vehicle speed and an accelerated arrival timing at which the vehicle arrives at the traffic light location after accelerating from the corrected vehicle speed at the allowable acceleration, and may determine that the vehicle is permitted to pass through the traffic light location when a permission display period displayed by the traffic light to indicate that the vehicle is permitted to pass through the traffic light location is included between the accelerated arrival timing and the arrival timing.

The passage assistance control unit may predict an arrival timing at which the vehicle arrives at the traffic light location after traveling at the corrected vehicle speed and a decelerated arrival timing at which the vehicle arrives at the traffic light location after decelerating from the corrected vehicle speed at the allowable deceleration, and may determine that the vehicle is permitted to pass through the traffic light location when a permission display period displayed by the traffic light to indicate that the vehicle is permitted to pass through the traffic light location is included between the arrival timing and the decelerated arrival timing.

A second aspect of the invention relates to a driving assistance method that assists driving of a vehicle. The driving assistance method includes: detecting a vehicle speed of the vehicle using a vehicle speed sensor; obtaining traffic light information relating to a change in a display condition of a traffic light disposed in an advancement direction of the vehicle; calculating relative position information between the vehicle and a traffic light location where the traffic light is disposed; detecting an operating condition of the vehicle at an intersection location before the traffic light; calculating a corrected vehicle speed on the basis of the operating condition and a current vehicle speed detected by the vehicle speed sensor; and determining whether or not the vehicle is permitted to pass through the traffic light location on the basis of the corrected vehicle speed, the relative position information between the vehicle and the traffic light location, and the traffic light information.

According to the configurations described above, driving by a driver can be assisted more appropriately.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A driving assistance apparatus according to an embodiment of the invention will be described in detail below with reference to the drawings. Note that the invention is not limited to this embodiment. Further, constituent elements of the following embodiment include elements that could be envisaged easily by a person skilled in the art and substantially identical elements.

Figure 1:
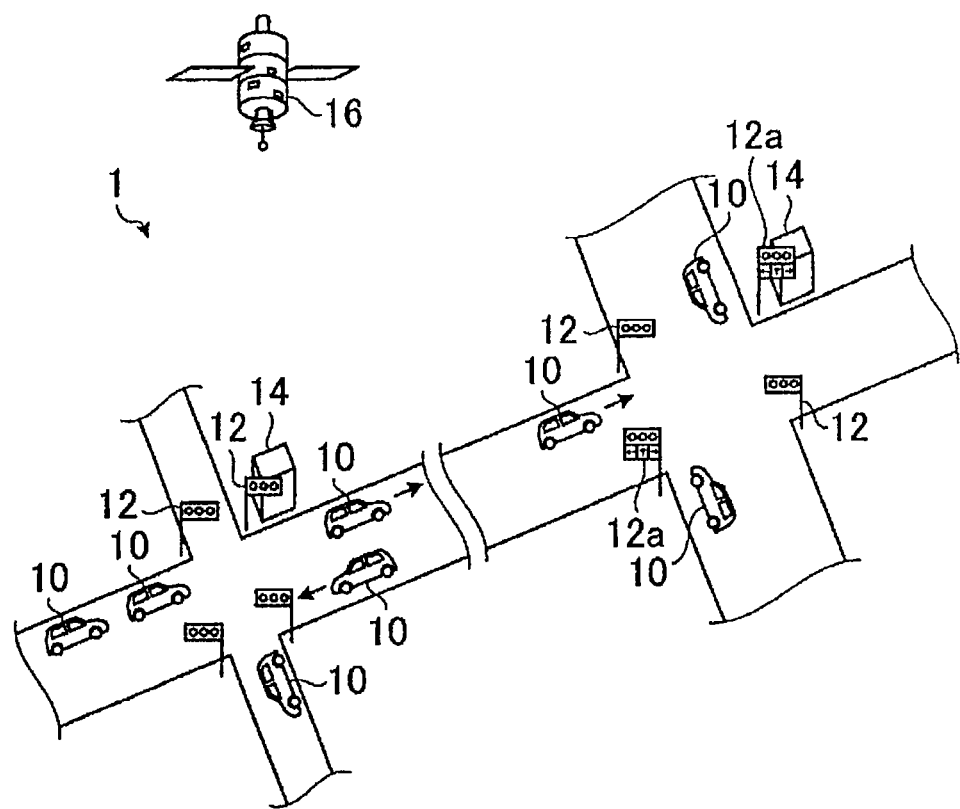
FIG. 1 is an illustrative view showing an example of a driving assistance system according to an embodiment.
Figure 2:
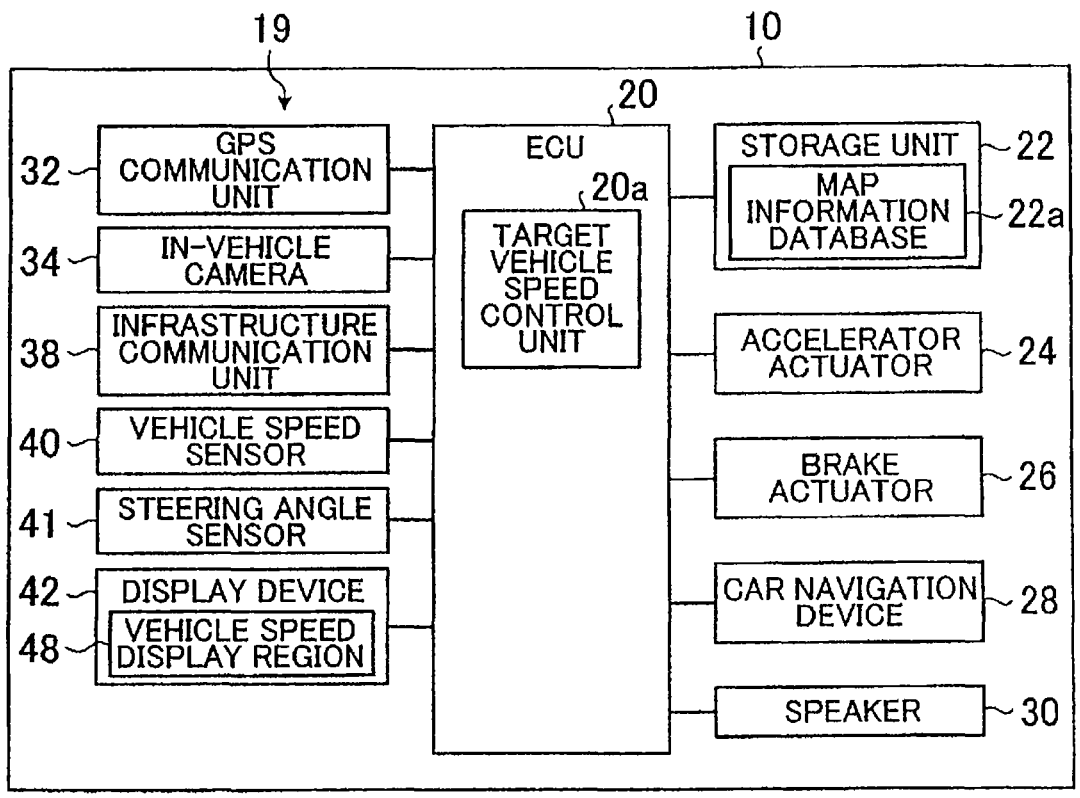
FIG. 2 is a block diagram showing a schematic configuration of a vehicle installed with a driving assistance apparatus according to this embodiment.
Figure 3:
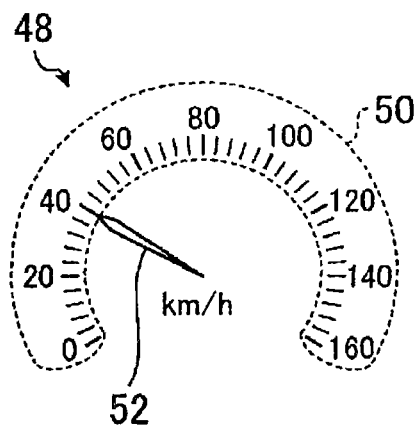
FIG. 3 is a schematic diagram showing an example of a vehicle speed display region of a display device.

Referring to FIGS. 1 to 7, an embodiment will be described. This embodiment relates to a driving assistance system including a vehicle installed with a driving assistance apparatus. First, using FIGS. 1 to 3, a configuration of the driving assistance system including the vehicle installed with the driving assistance apparatus will be described. FIG. 1 is an illustrative view showing an example of the driving assistance system according to this embodiment. FIG. 2 is a block diagram showing a schematic configuration of the vehicle installed with the driving assistance apparatus according to this embodiment. FIG. 3 is a schematic diagram showing an example of a vehicle speed display region of a display device.

A driving assistance system 1 shown in FIG. 1 includes a plurality of vehicles 10, a plurality of traffic lights 12, 12a, a plurality of infrastructure information transmission apparatuses 14, and a global positioning system (GPS) satellite 16. The driving assistance system 1 assists driving by a driver of a vehicle 10 installed with a driving assistance apparatus 19 to be described below, from among the plurality of vehicles 10, on the basis of driving assistance information. The driving assistance information is obtained by detecting a relationship with another vehicle 10 and obtained from the infrastructure information transmission apparatuses 14 and the GPS satellite 16.

The vehicles 10 are vehicles that can travel on roads, for example automobiles, trucks, and the like. The vehicles 10 are capable of traveling on roads on which the traffic lights 12, 12a are disposed. A configuration of the vehicle 10 will be described below.

The traffic lights 12, 12a are light apparatuses disposed at intersections. The traffic light 12 includes light portions in three colors, namely green, yellow, and red. The traffic light 12a includes, in addition to the light portions in the three colors, a light portion that displays an arrow (an arrow light portion). The traffic lights 12, 12a are disposed on roads in respective vehicle travel directions. The traffic light 12 indicates whether a vehicle 10 traveling on a corresponding road is permitted to pass in the travel direction of the vehicle 10 or the vehicle 10 is not permitted to pass, i.e. the vehicle 10 must stop, by switching an illuminated light portion from among the light portions in the three colors. In the driving assistance system 1 shown in FIG. 1, the traffic lights 12, 12a are disposed at intersections, but disposal positions of the traffic lights 12, 12a are not limited to intersections, and the traffic lights 12, 12a may be disposed at pedestrian crossings, for example. In FIG. 1, the traffic lights 12, 12a are depicted such that all of the light portions are visible, but the traffic lights 12, 12a are disposed to be visible by vehicles 10 advancing toward the light portions (vehicles intending to pass through the traffic lights 12, 12a).

The infrastructure information transmission apparatuses 14 transmit infrastructure information such as road information relating to the roads on which the vehicles 10 travel and traffic light information relating to the traffic lights 12, 12a ahead of the vehicles 10 in the travel direction. The infrastructure information transmission apparatus 14 according to this embodiment is disposed at each intersection in order to transmit the infrastructure information to vehicles 10 traveling within a fixed range around the intersection through wireless communication. Here, the road information typically includes vehicle speed limit information, intersection stop line position information, and so on relating to the roads on which the vehicles 10 are traveling. The traffic light information typically includes light cycle information such as an illumination cycle of the green light, the yellow light, and the red light of the traffic lights 12, 12a, and light change timings. The infrastructure information transmission apparatus 14 may be provided for each traffic light 12, 12a, or may be provided singly for a plurality of intersections.

The GPS satellite 16 outputs GPS signals required for position detection by a Global Positioning System (GPS). FIG. 1 shows only one GPS satellite 16, but the driving assistance system 1 includes at least three GPS satellites 16. An apparatus for detecting a position using GPS receives GPS signals output from the at least three GPS satellites 16, and detects a position of a host apparatus, by comparing the received GPS signals.

Next, using FIG. 2, the vehicle 10 installed with the driving assistance apparatus 19 will be described. In the driving assistance system 1 shown in FIG. 1, all of vehicles 10 are installed with the driving assistance apparatuses 19, but it is sufficient for at least one of the vehicles 10 to be installed with the driving assistance apparatus 19. In other words, in the driving assistance system 1, vehicles not installed with the driving assistance apparatus 19 may travel in front of and behind the vehicle 10 installed with the driving assistance apparatus 19.

The vehicle 10 includes an electronic control unit (ECU) 20, a storage unit 22, an accelerator actuator 24, a brake actuator 26, a car navigation device 28, a speaker 30, a GPS communication unit 32, an in-vehicle camera 34, an infrastructure communication unit 38, a vehicle speed sensor 40, a steering angle sensor 41, a display device 42, an ACC switch, and a PCS switch. The ECU 20, the storage unit 22, the accelerator actuator 24, the brake actuator 26, the car navigation device 28, the speaker 30, the GPS communication unit 32, the in-vehicle camera 34, the infrastructure communication unit 38, the vehicle speed sensor 40, the steering angle sensor 41, the display device 42, the ACC switch, and the PCS switch constitute the driving assistance apparatus 19 of the vehicle 10. In addition to the parts described above, the vehicle 10 includes various parts typically provided in a vehicle, such as a body, a drive source, a brake apparatus, operating units (a steering wheel, an accelerator pedal, and a brake pedal, for example), and so on.

The ECU 20 controls the respective parts of the vehicle 10, the accelerator actuator 24, the brake actuator 26, the car navigation device 28, the speaker 30, the GPS communication unit 32, the in-vehicle camera 34, the infrastructure communication unit 38, the vehicle speed sensor 40, the display device 42, and so on. The ECU 20 controls operations of the respective parts on the basis of information obtained by the GPS communication unit 32, the in-vehicle camera 34, the infrastructure communication unit 38, and the vehicle speed sensor 40, and operations by a driver or the like input from various operating units such as the ACC switch and the PCS switch as well as the accelerator pedal, brake pedal, and so on, not shown in the drawing. Further, the ECU 20 includes a target vehicle speed control unit 20a. The target vehicle speed control unit 20a will be described below.

The storage unit 22 is a storage device such as a memory. The storage unit 22 stores conditions and data required for various processing performed by the ECU 20, and various programs executed by the ECU 20. The storage unit 22 also stores a map information database 22a. The map information database 22a stores information required for vehicle travel (maps, straight roads, curves, uphill and downhill slopes, expressways, sag zones, tunnels, and so on). The map information database 22a includes a map data file, an intersection data file, a node data file, and a road data file. The ECU 20 reads required information by referring to the map information database 22a.

The accelerator actuator 24 controls an output of a power supply of the vehicle 10 such as an engine or a motor. For example, the accelerator actuator 24 controls an amount of intake air taken into the engine, an intake timing and an ignition timing, a voltage value and a frequency of electric power supplied to the motor, and so on. The accelerator actuator 24 is electrically connected to the ECU 20 such that an operation of the accelerator actuator 24 is controlled by the ECU 20. The ECU 20 activates the accelerator actuator 24 in response to an accelerator control signal in order to adjust the amount of intake air taken into the engine, the intake timing and ignition timing, and the voltage value and frequency of electric power supplied to the motor. In other words, the accelerator actuator 24 is a device for automatically controlling a driving force generated by the power supply, which, by driving various parts upon reception of the accelerator control signal output from the ECU 20, controls driving conditions such that a desired driving force is generated. By controlling the driving force acting on the vehicle 10 in this manner, the accelerator actuator 24 adjusts an acceleration.

The brake actuator 26 controls driving of the brake apparatus installed in the vehicle 10. For example, the brake actuator 26 controls an oil pressure of a wheel cylinder provided in the brake apparatus. The brake actuator 26 is electrically connected to the ECU 20 such that an operation thereof is controlled by the ECU 20. The ECU 20 activates the brake actuator 26 in response to a brake control signal in order to adjust the brake oil pressure of the wheel cylinder. In other words, the brake actuator 26 is a device for automatically controlling a braking force generated by a brake, which, by driving a solenoid, a motor, or the like of a mechanism that supplies working oil to the wheel cylinder upon reception of the brake control signal output from the ECU 20, controls the brake oil pressure such that a desired braking force is generated. By controlling the braking force acting on the vehicle 10 in this manner, the brake actuator 26 adjusts a deceleration.

The car navigation device 28 guides the vehicle 10 to a desired destination. The car navigation device 28 is capable of bidirectional communication with the ECU 20. The car navigation device 28 includes a display unit that displays peripheral map information on the basis of the information stored in the map information database 22a and current position information obtained by the GPS communication unit 32, to be described below. Further, the car navigation device 28 detects a route to the destination on the basis of the information stored in the map information database 22a, the current position information obtained by the GPS communication unit 32 to be described below, and destination information input by the driver or the like, and displays information relating to the detected route on the display unit. The car navigation device 28 may include its own map information database and GPS communication unit separately from the map information database 22a and the GPS communication unit 32. In this case, the car navigation device 28 may be configured to perform route guidance and provide notification of the current position information using its own units.

The speaker 30 outputs audio to a vehicle interior of the vehicle 10. The speaker 30 outputs audio corresponding to an audio signal transmitted from the ECU 20 to the vehicle interior.

The GPS communication unit 32 receives GPS signals output respectively from the plurality of GPS satellites 16. The GPS communication unit 32 transmits the received GPS signals to the ECU 20. The ECU 20 detects position information relating to the host apparatus by analyzing the plurality of received GPS signals.

The in-vehicle camera 34 is an imaging device disposed on a front portion of the vehicle 10. The in-vehicle camera 34 obtains an image of the front (an advancement direction side) of the vehicle 10. The in-vehicle camera 34 transmits the obtained image of the front of the vehicle 10 to the ECU 20. The ECU 20 obtains information indicating a condition in front of the vehicle 10, more specifically whether or not another vehicle 10 is present in front of the vehicle 10, whether or not a traffic light 12, 12a is close, whether or not an intersection is close, and so on, by analyzing the image obtained by the in-vehicle camera 34.

The infrastructure communication unit 38 communicates wirelessly with the infrastructure information transmission apparatus 14 described above. The infrastructure communication unit 38 obtains infrastructure information transmitted from the infrastructure information transmission apparatus 14, and transmits the obtained infrastructure information to the ECU 20. The infrastructure communication unit 38 may obtain the infrastructure information by communicating constantly with an infrastructure information transmission apparatus 14 that is capable of communication, by communicating with the infrastructure information transmission apparatus 14 at fixed time intervals, or by communicating with a new infrastructure information transmission apparatus 14 when the information transmission apparatus 14 becomes capable of communication.

The vehicle speed sensor 40 detects a vehicle speed of the vehicle 10. The vehicle speed sensor 40 transmits information indicating the detected vehicle speed to the ECU 20.

The steering angle sensor 41 detects an operating angle (a steering angle) of the steering wheel operated by the driver. The steering angle sensor 41 detects a steering angle of a vehicle wheel of the vehicle 10 by detecting the operating angle of the steering wheel. The steering angle sensor 41 transmits information indicating the detected steering angle to the ECU 20.

The display device 42 displays various information to be imparted to the driver. The display device 42 is an instrument panel disposed on a dashboard of the vehicle 10, for example. The display device 42 may be a liquid crystal display device or a display device on which various measuring instruments are disposed. The display device 42 displays information such as a remaining amount of fuel, an output of the drive source (i.e. an engine rotation speed), an open/closed condition of a door, and a fastened/unfastened condition of a seatbelt. The display device 42 includes a vehicle speed display region 48 in which the vehicle speed is displayed.

As shown in FIG. 3, the vehicle speed display region 48 includes a scale display portion 50 and a needle 52. The scale display portion 50 takes an arc shape and includes a scale extending from 0 km/h to 160 km/h. The needle 52 indicates the vehicle speed obtained as the detection result, and in FIG. 3, the needle 52 indicates 40 km/h. The vehicle speed display region 48 is an analog meter on which the position indicated by the needle 52 varies in accordance with the current vehicle speed. Hence, by checking the position indicated by the needle 52 in the vehicle speed display region 48, the driver can acknowledge the detection result of the current vehicle speed.

Next, control executed by the target vehicle speed control unit (passage assistance control unit) 20a of the ECU 20 will be described. The target vehicle speed control unit 20a determines whether or not the vehicle 10 is permitted to pass through a subject traffic light location (a passage subject region, the passage subject intersection or pedestrian crossing at which the traffic light 12, 12a is disposed) on the basis of the information obtained by the respective parts of the vehicle 10. Further, having determined that the vehicle 10 is permitted to pass through the subject traffic light location, the target vehicle speed control unit 20a determines a vehicle speed region in which the vehicle 10 is permitted to pass through the subject traffic light location as a target vehicle speed region, and displays the determined target vehicle speed region in the vehicle speed display region 48 of the display device 42. More specifically, the target vehicle speed control unit 20a determines whether or not the vehicle 10 is able to pass through the traffic light location within a predetermined period (without stopping before the traffic light location) on the basis of the light cycle information obtained by the infrastructure communication unit 38, a distance between the vehicle 10 and the traffic light 12, 12a, information indicating the current vehicle speed detected by the vehicle speed sensor 40, and information such as an operating condition at an intersection location before the subject traffic light location and a vehicle speed correction condition based on the operating condition. Here, the light cycle information is a traffic light information relating to the change in the display condition of the traffic light 12, 12a disposed at the traffic light location. The light cycle information includes the illumination cycle of the traffic light 12, 12a, the light change timing of the traffic light 12, 12a, and so on. The distance between the vehicle 10 and the traffic light 12, 12a is, to be precise, a distance between the vehicle 10 and the traffic light location at which the traffic light 12, 12a is disposed. The predetermined period is a period during which the traffic light 12, 12a is in a display condition (green light condition, for example) indicating that passage of the vehicle 10 is permitted. The intersection location is the location of a stop line where the vehicle stops or the location of a fork where the vehicle turns right or left, and includes a pedestrian crossing as well as an intersection. The intersection location may include a pedestrian crossing and a region to the front and rear of the pedestrian crossing as well as an intersection. A traffic light may or may not be provided at the intersection location. The target vehicle speed control unit 20a, having determined that the vehicle 10 is permitted to pass through the subject traffic light location, calculates a travel speed region (the target vehicle speed region) required to pass the traffic light location while the traffic light 12, 12a is in the display condition indicating that passage of the vehicle 10 is permitted. The target vehicle speed control unit 20a then displays the calculated target vehicle speed region (recommended travel speed region) in the vehicle speed display region 48. In so doing, the target vehicle speed control unit 20a performs green wave assistance, which is control for providing the driver with vehicle speed guidance to reduce the number of times the vehicle 10 stops at a red light. In the display condition indicating that passage through the traffic light is permitted, the traffic light generates a display indicating that passage through a subject route is permitted. The display condition indicating that passage through the traffic light is permitted is not limited to a condition in which the green light is displayed, and includes a condition in which the arrow light is displayed. A condition in which the yellow light is displayed may also be included in the display condition indicating that passage through the traffic light is permitted.

Figure 4:
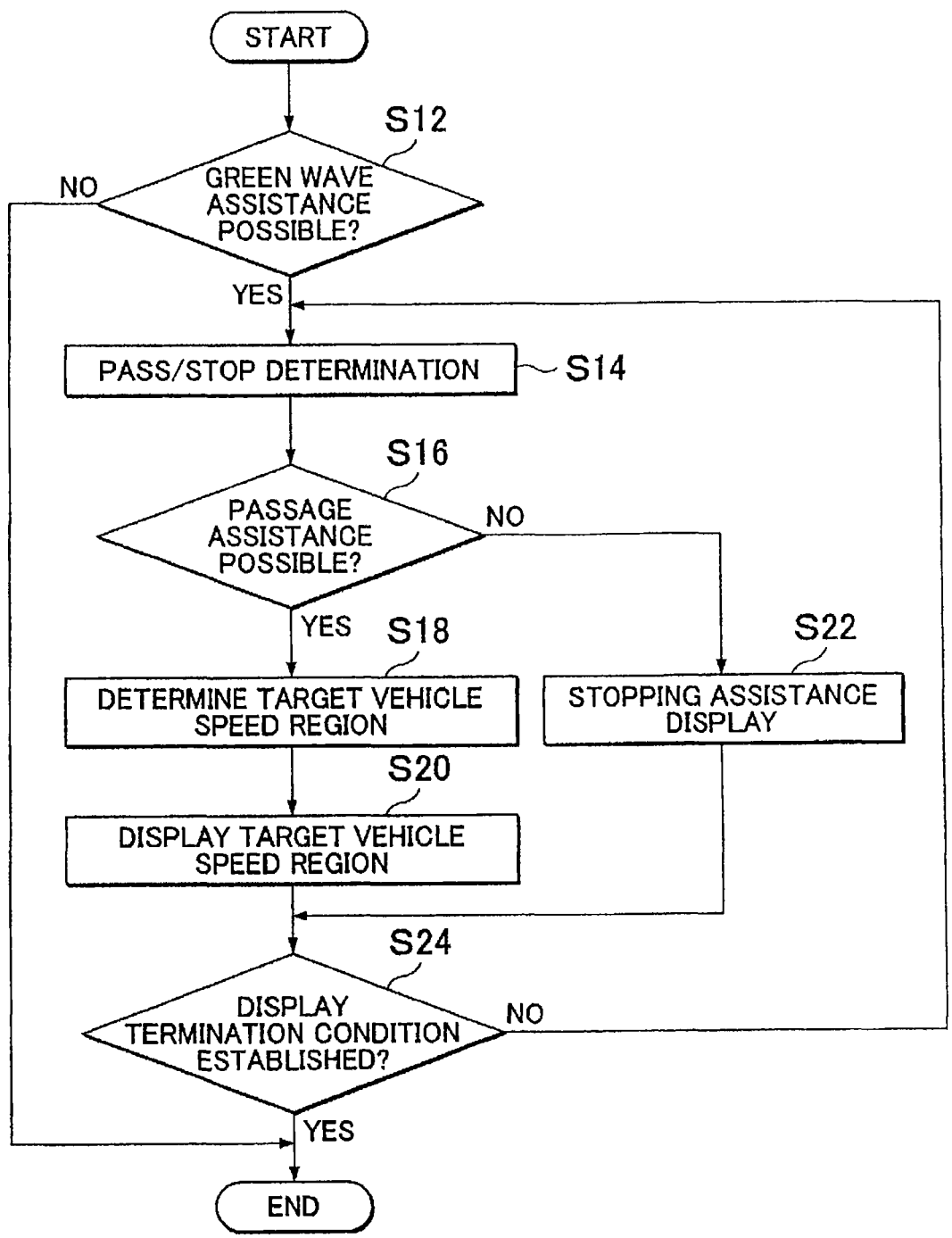
FIG. 4 is a flowchart showing an example of processing performed by the driving assistance apparatus.
Figure 5:
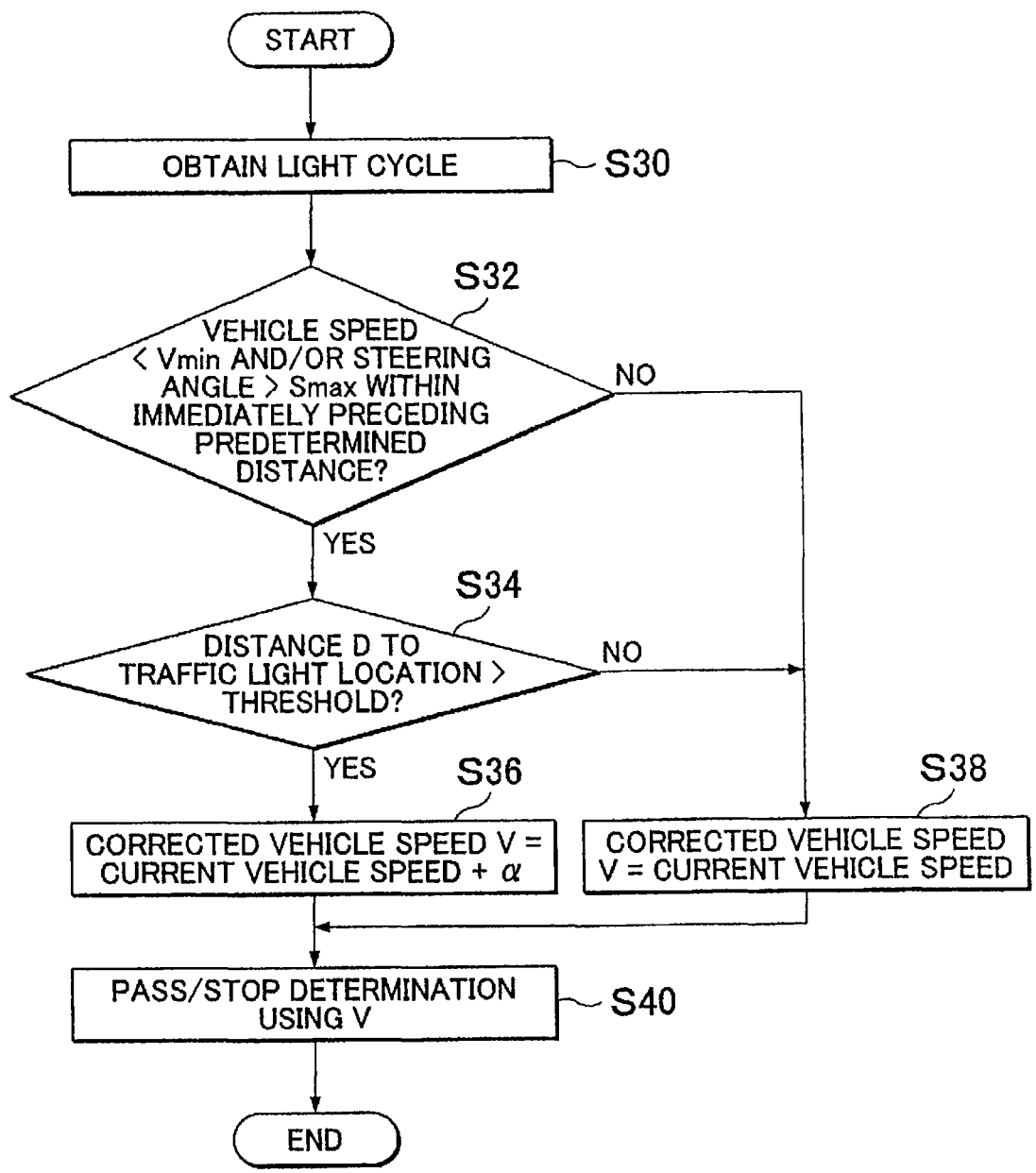
FIG. 5 is a flowchart showing an example of the processing performed by the driving assistance apparatus.
Figure 6:
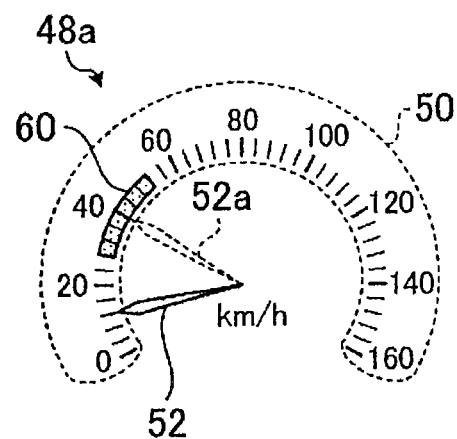
FIG. 6 is a schematic diagram showing an example of the vehicle speed display region of the display device.
Figure 7:
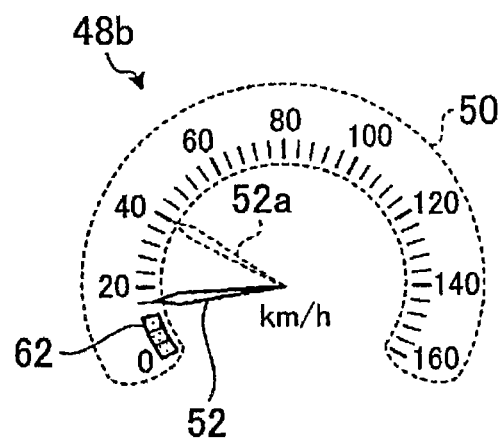
FIG. 7 is a schematic diagram showing an example of the vehicle speed display region of the display device.

Next, using FIGS. 4 to 7, the control executed by the target vehicle speed control unit 20a in the ECU 20 of the vehicle 10 will be described in further detail. FIGS. 4 and 5 are flowcharts showing examples of the processing performed by the driving assistance apparatus. FIGS. 6 and 7 are schematic diagrams showing respective examples of the vehicle speed display region of the display device.

In Step S12, the target vehicle speed control unit 20a of the ECU 20 determines whether or not green wave assistance is possible. More specifically, the target vehicle speed control unit 20a determines whether or not information required to calculate the target vehicle speed region has been obtained and a condition enabling display of the target vehicle speed region is satisfied. The information required to calculate the target vehicle speed region is the infrastructure information including the illumination cycle, light change timing, and so on of the passage subject traffic light 12, 12a, the current position information required to calculate the distance between the vehicle 10 and the traffic light 12, 12a, and map information including information indicating the position of the traffic light 12, 12a. Further, the condition enabling display of the target vehicle speed region is satisfied when the distance between the vehicle 10 and the traffic light 12, 12a (the distance between the vehicle 10 and the traffic light location) equals or exceeds a fixed distance, the current vehicle speed of the vehicle 10 equals or exceeds a fixed vehicle speed, and so on. When the distance between the vehicle 10 and the traffic light location is smaller than the fixed distance, even if the target vehicle speed region is displayed, the driver cannot easily drive in accordance with the target vehicle speed region, and therefore the target vehicle speed control unit 20a determines that the green wave assistance is not possible. When the current vehicle speed of the vehicle 10 is lower than the fixed vehicle speed, it is likely that the vehicle speed of the vehicle 10 is restricted because congestion on the road on which the vehicle 10 is traveling, or it is likely that the vehicle 10 is about to stop, has already stopped, or the like for some reason. Therefore, when the current vehicle speed of the vehicle 10 is lower than the fixed vehicle speed, even if the target vehicle speed region is displayed, the driver cannot easily drive in accordance with the target vehicle speed region, and therefore the target vehicle speed control unit 20a determines that the green wave assistance is not possible. When the target vehicle speed control unit 20a determines in Step S12 that the green wave assistance is not possible (No), the processing is terminated.

Having determined in Step S12 that the green wave assistance is possible (Yes), the target vehicle speed control unit 20a performs a pass/stop determination in Step S14. Processing performed in the pass/stop determination will now be described using FIG. 5.

In Step S30, as shown in FIG. 5, the target vehicle speed control unit 20a obtains the light cycle information. In other words, the target vehicle speed control unit 20a obtains the light cycle information of a determination subject traffic light, which is normally the next traffic light to be passed. Having obtained the light cycle information in Step S30, the target vehicle speed control unit 20a determines in Step S32 whether or not the vehicle speed fell below a vehicle speed threshold Vmin and/or whether or not the steering angle increased beyond a steering angle threshold Smax within an immediately preceding predetermined distance. By determining whether or not the vehicle speed fell below the vehicle speed threshold Vmin within the immediately preceding predetermined distance, the target vehicle speed control unit 20a determines whether or not the vehicle 10 stopped or decelerated greatly when passing through the intersection location before the subject traffic light location. By determining whether or not the steering angle increased beyond the steering angle threshold Smax within the immediately preceding predetermined distance, the target vehicle speed control unit 20a determines whether or not the vehicle 10 turned right or left when passing through the intersection location before the subject traffic light location. Note that the steering angle threshold Smax and the vehicle speed threshold Vmin may be calculated through experiment or the like.

Having determined in Step S32 that the vehicle speed is not lower than the vehicle speed threshold Vmin and the steering angle is not larger than the steering angle threshold Smax (No), the target vehicle speed control unit 20a determines that the vehicle 10 neither stopped nor performed a right/left turn when passing through the intersection location before the subject traffic light location, and advances to Step S38.

After determining in Step S32 that either the vehicle speed is lower than the vehicle speed threshold Vmin or the steering angle is larger than the steering angle threshold Smax, or that both the vehicle speed is lower than the vehicle speed threshold Vmin and the steering angle is larger than the steering angle threshold Smax (Yes), the target vehicle speed control unit 20a determines that the vehicle 10 performed at least one of a stop and a right/left turn when passing through the intersection location before the subject traffic light location, and therefore determines in Step S34 whether or not a distance D to the traffic light location is larger than a distance threshold. Note that the distance threshold may be calculated through experiment or the like.

After determining in Step S34 that the distance D to the traffic light location is larger than the distance threshold, the target vehicle speed control unit 20a advances to Step S36. Having determined in Step S34 that the distance D to the traffic light location is not larger than the distance threshold, or in other words that the distance D to the traffic light location is equal to or smaller than the distance threshold, the target vehicle speed control unit 20a advances to Step S38.

Having determined Yes in Step S34, the target vehicle speed control unit 20a sets a corrected vehicle speed V at a vehicle speed obtained by adding a first vehicle speed α to the current vehicle speed in Step S36. In other words, when the vehicle speed has fallen below the vehicle speed threshold Vmin and/or the steering angle has increased beyond the steering angle threshold Smax within the immediately preceding predetermined distance and the distance D to the subject traffic light location is larger than the distance threshold, the target vehicle speed control unit 20a sets the corrected vehicle speed V at a vehicle speed that is higher than the actual vehicle speed by the first vehicle speed α. After setting the corrected vehicle speed V in Step S36, the target vehicle speed control unit 20a advances to Step S40.

Having determined No in Step S32 or No in Step S34, the target vehicle speed control unit 20a sets the corrected vehicle speed V at the current vehicle speed in Step S38. In other words, when the vehicle speed has not fallen below the vehicle speed threshold Vmin and the steering angle has not increased beyond the steering angle threshold Smax within the immediately preceding predetermined distance, or when the distance D to the subject traffic light location is equal to or smaller than the distance threshold, the target vehicle speed control unit 20a sets the corrected vehicle speed V at the current vehicle speed (the actual vehicle speed). After setting the corrected vehicle speed V in Step S38, the target vehicle speed control unit 20*a* advances to Step S40.

After setting the corrected vehicle speed V in Step S36 or Step S38, the target vehicle speed control unit 20*a* executes a pass/stop determination using the corrected vehicle speed V in Step S40. For example, the target vehicle speed control unit 20*a* calculates a reference target vehicle speed region on the basis of the obtained information, and determines whether to perform passage assistance or stopping assistance on the basis of a relationship between the calculated reference target vehicle speed region and the corrected vehicle speed V. Here, the reference target vehicle speed region is a vehicle speed region in which the vehicle 10 is to pass (without stopping) through the subject traffic light location, such as an intersection or a pedestrian crossing, or in other words a vehicle speed region in which the vehicle 10 is to pass through the subject traffic light location while the green light of the subject traffic light is illuminated. The target vehicle speed control unit 20*a* determines that stopping assistance is required when a lower limit vehicle speed of the reference target vehicle speed region is higher than the corrected vehicle speed V and a difference therebetween is larger than a vehicle speed β, or in other words when a speed obtained by adding a second vehicle speed β to the corrected vehicle speed V is smaller than the lower limit vehicle speed of the reference target vehicle speed region. Note that the pass/stop determination using the corrected vehicle speed V is not limited to the method described above. Other examples of the pass/stop determination using the corrected vehicle speed V will be described below.

Returning to FIG. 4, description of the flowchart will be continued. After performing the pass/stop determination in Step S14, the target vehicle speed control unit 20*a* determines in Step S16 whether or not passage assistance is possible, or in other words whether or not it has been determined in Step S14 that passage assistance is required. After determining in Step S16 that passage assistance is possible (Yes), or in other words when it is determined in Step S14 that passage assistance is required, the target vehicle speed control unit 20*a* sets the target vehicle speed region in Step S18. For example, the target vehicle speed control unit 20*a* sets the target vehicle speed region to be displayed in the vehicle speed display region 48 on the basis of the reference target vehicle speed region calculated in Step S14, the corrected vehicle speed V, and a preset condition. Here, the target vehicle speed control unit 20*a* according to this embodiment sets an upper limit vehicle speed (a display upper limit vehicle speed) of the target vehicle speed region at a speed no higher than a speed obtained by adding the second speed β to the corrected vehicle speed V.

After determining the target vehicle speed region in Step S18, the target vehicle speed control unit 20*a* executes passage assistance display in Step S20. As the passage assistance display, the target vehicle speed control unit 20*a* displays the determined target vehicle speed region in the vehicle speed display region 48. For example, the target vehicle speed control unit 20*a* displays a vehicle speed display region 48*a* shown in FIG. 6. In the vehicle speed display region 48*a*, a mark 60 is displayed over a vehicle speed region that overlaps the target vehicle speed region in the scale display portion 50. In this embodiment, the target vehicle speed region is 30 km/h to 50 km/h, and therefore the mark 60 is displayed in a vehicle speed region extending from 30 km/h to 50 km/h. Further, the current vehicle speed is approximately 10 km/h, and therefore the needle 52 indicates approximately 10 km/h in the vehicle speed display region 48*a*. Furthermore, in the vehicle speed display region 48*a*, the corrected vehicle speed is approximately 40 km/h, and therefore the target vehicle speed region is calculated using approximately 40 km/h, which is indicated by a needle 52*a*, as a reference. Note that when the scale display portion 50 is displayed as an image in a liquid crystal display device, the vehicle speed display region 48*a* may be formed by overlapping an image of the mark 60 onto the image of the scale display portion 50. Further, when the scale display portion 50 is drawn using ink or the like, the vehicle speed display region 48*a* may be formed by disposing a light emitting portion in a part of the scale display portion 50 depicting the scale and displaying the mark 60 by illuminating a part of the light emitting portion corresponding to the target vehicle speed region. By displaying the determined target vehicle speed region in the form of the mark 60 overlapped onto the scale display portion 50 in this manner, the target vehicle speed control unit 20*a* can cause a user to acknowledge the determined target vehicle speed region. After performing the processing of Step S20, the target vehicle speed control unit 20*a* advances to Step S24.

Having determined in Step S16 that the passage assistance is not possible (No), or in other words when it is determined in Step S14 that stopping assistance is required, the target vehicle speed control unit 20*a* executes stopping assistance display in Step S22. In the stopping assistance display, a speed region in the vicinity of 0 km/h is displayed as the target vehicle speed region. For example, the target vehicle speed control unit 20*a* displays a vehicle speed display region 48*b* shown in FIG. 7. In the vehicle speed display region 48*b*, a mark 62 is displayed over a vehicle speed region that overlaps the target vehicle speed region in the scale display portion 50. Here, the target vehicle speed region is a vehicle speed region in the vicinity of 0 km/h (a vehicle speed region including 0 km/h, in this embodiment 0 km/h to 10 km/h), and therefore the mark 62 is displayed in a vehicle speed region in the vicinity of 0 km/h. Further, the actual current vehicle speed is approximately 10 km/h, and therefore the needle 52 indicates approximately 10 km/h. Furthermore, in the vehicle speed display region 48*a*, the corrected vehicle speed is approximately 40 km/h, and therefore the target vehicle speed region is calculated using approximately 40 km/h, which is indicated by the needle 52*a*, as a reference. By displaying the determined target vehicle speed region in the form of the mark 62 overlapped onto the scale display portion 50 in this manner, the target vehicle speed control unit 20*a* can cause the user to acknowledge the determined target vehicle speed region. Hence, in Step S22, the user can acknowledge that stoppage of the vehicle 10 has been recommended. After performing the processing of Step S22, the target vehicle speed control unit 20*a* advances to Step S24.

After performing the processing of Step S20 or the processing of Step S22, the target vehicle speed control unit 20*a* determines whether or not a display termination condition is established in Step S24. Here, the display termination condition is a preset condition for terminating display of the target vehicle speed region. The display termination condition is established when, for example, the distance between the vehicle and the subject traffic light location falls to or below a fixed value, the vehicle speed departs from a fixed region, a fixed amount of time elapses following display of the target vehicle speed region, or similar. Having determined in Step S24 that the display termination condition is not established (No), the target vehicle speed control unit 20*a* advances to Step S14 and repeats the processing described above. In other words, the target vehicle speed region is recalculated and displayed again. Having determined in Step S24 that the display termination condition is established (Yes), the target vehicle speed control unit 20*a* terminates the processing.

Hence, through the processing shown in FIG. 5, the driving assistance apparatus 19 (as well as the vehicle 10 and the driving assistance system 1 including the driving assistance apparatus 19) can perform the pass/stop determination using a condition more suited to the traveling condition of the vehicle 10 by calculating the corrected vehicle speed on the basis of the operating condition of the vehicle 10, or more specifically the operating condition during passage through the intersection location before the subject traffic light, and performing the pass/stop determination on the basis of the calculated corrected vehicle speed.

The vehicle speed of the vehicle 10 is low immediately after starting to advance at the intersection location or immediately after turning right or left at the intersection location. Therefore, when the pass/stop determination is performed using the current vehicle speed of the vehicle 10 as a reference, the current vehicle speed may not satisfy the determination reference, whereby it is determined to be impossible to pass through the subject traffic light location, even in a case where the vehicle 10 is able to pass through the subject traffic light location by accelerating toward a vehicle speed limit. Here, however, the driving assistance apparatus 19 calculates the corrected vehicle speed by correcting the current vehicle speed in accordance with the operating condition, and therefore the driving assistance apparatus 19 can execute the pass/stop determination in relation to the traffic light location ahead of the intersection location appropriately both during and after passage through the intersection location. In other words, in a case where the vehicle 10 is expected to accelerate to a predetermined speed while traveling toward the intersection location, for example immediately after starting to advance at the intersection location or immediately after turning right or left at the intersection location, the pass/stop determination can be performed using a condition that is suited to the actual travel condition by setting the corrected vehicle speed obtained by adding the first vehicle speed α to the current vehicle speed, rather than the current vehicle speed, as a reference. By performing the pass/stop determination on the basis of the corrected vehicle speed, the driving assistance apparatus 19 can determine that passage assistance is possible in a case where the vehicle 10 is able to pass through the traffic light location by accelerating. Hence, the driver is less likely to feel a sense of distrust in the driving assistance, and therefore the driving of the driver can be assisted more appropriately.

When the distance to the traffic light location is smaller than the fixed value, the driving assistance apparatus 19 sets the corrected vehicle speed at the current vehicle speed. When the distance to the traffic light location is smaller than the fixed value, acceleration at the first vehicle speed α may correspond to rapid acceleration. Accordingly, the pass/stop determination is executed using the current vehicle speed as the corrected vehicle speed rather than the corrected vehicle speed obtained by adding the first vehicle speed α to the current vehicle speed. In so doing, a situation in which passage assistance is performed by displaying a target vehicle speed region that is difficult to reach can be suppressed.

In Step S36, the target vehicle speed control unit 20a sets the corrected vehicle speed at the speed obtained by adding the first vehicle speed α to the current vehicle speed, but a vehicle speed correction method is not limited thereto, and the target vehicle speed control unit 20a may, for example, set the corrected vehicle speed at a vehicle speed limit in Step S36. Further, the target vehicle speed control unit 20a may calculate the corrected vehicle speed using a method of calculating a correction amount on the basis of the distance to the traffic light location, an acceleration condition, and so on.

When a vehicle exists ahead of the vehicle 10 in Step S36, the target vehicle speed control unit 20a may set the corrected vehicle speed at the current vehicle speed. By not correcting the vehicle speed when a vehicle exists ahead, a situation in which a target vehicle speed region requiring acceleration is displayed even though acceleration of the vehicle 10 is restricted can be suppressed.

Figure 8:
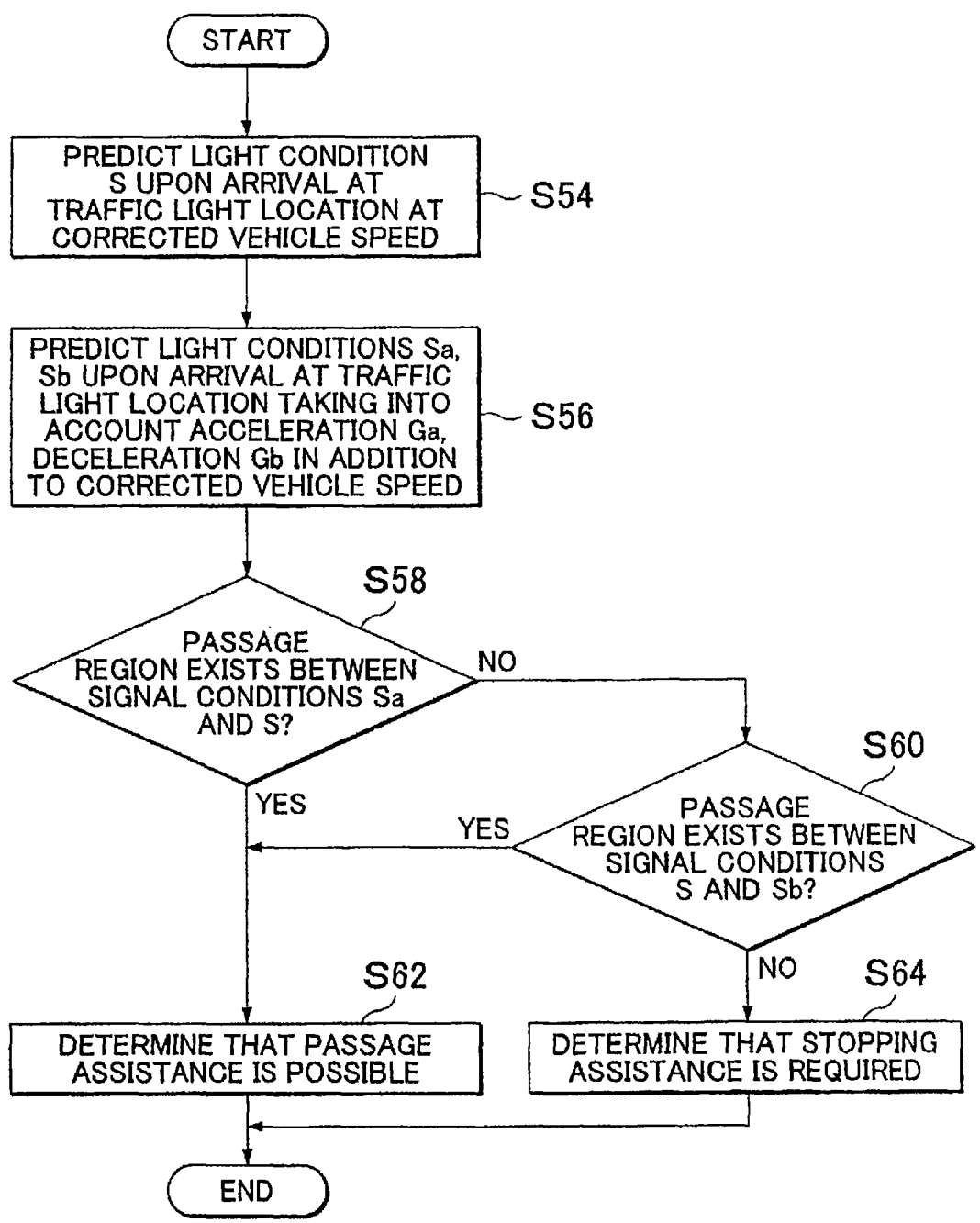
FIG. 8 is a flowchart showing an example of the processing performed by the driving assistance apparatus.
Figure 9:
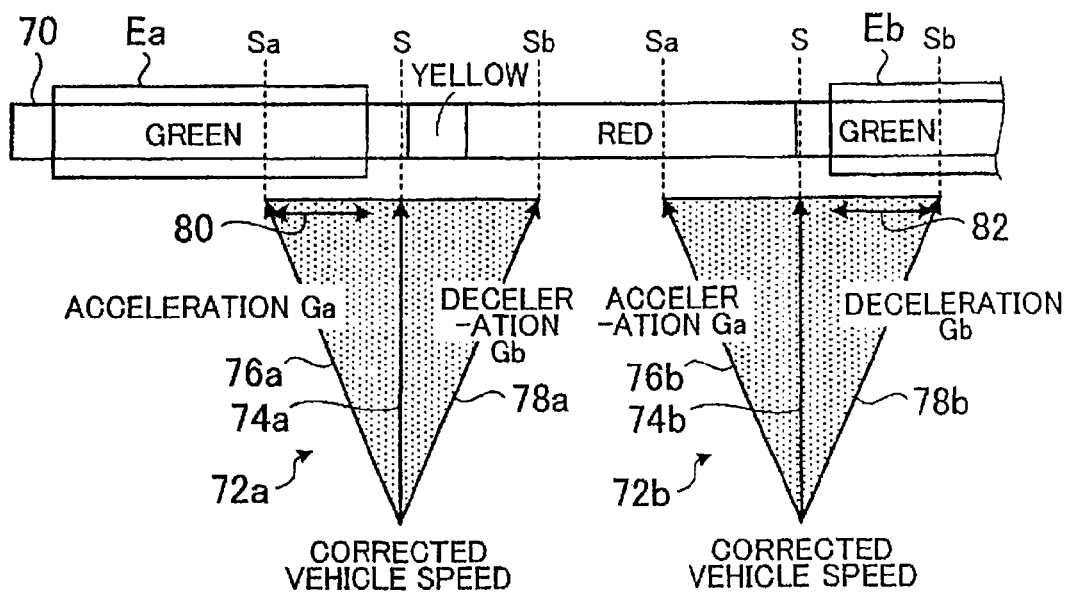
FIG. 9 is an illustrative view illustrating an example of the processing performed by the driving assistance apparatus.

Next, using FIGS. 8 to 11, another example of the pass/stop determination executed in Step S40 will be described. Here, FIG. 8 is a flowchart showing an example of the processing performed by the driving assistance apparatus, and FIG. 9 is an illustrative view illustrating an example of the processing performed by the driving assistance apparatus.

In Step S54, the target vehicle speed control unit 20a predicts a light condition S at a time point where the vehicle 10 arrives at the subject intersection or pedestrian crossing (i.e. the traffic light location) after traveling at the corrected vehicle speed. More specifically, the target vehicle speed control unit 20a predicts an arrival timing (a normal arrival timing) at the traffic light location on the basis of the distance between the vehicle 10 and the subject traffic light 12, 12a, or more precisely the traffic light location where the traffic light is disposed, and the corrected vehicle speed, and predicts the condition of the traffic light at the predicted normal arrival timing as the light condition S on the basis of the predicted normal arrival timing and the light cycle information. Here, the light condition S includes the light color of the traffic light upon arrival at the traffic light location, a display time of the displayed light color (an elapsed time from the start of display), and a time remaining until the traffic light changes to the next light color (a remaining display time of the displayed light color).

After predicting the light condition S upon arrival at the traffic light location in Step S54, the target vehicle speed control unit 20a predicts, in Step S56, light conditions Sa, Sb upon arrival at the traffic light location taking into consideration an acceleration (an allowable acceleration) Ga and a deceleration (an allowable deceleration) Gb in addition to the corrected vehicle speed. Prediction of the light condition Sa upon arrival at the traffic light location taking into consideration the allowable acceleration Ga will now be described. The target vehicle speed control unit 20a predicts an arrival timing (an accelerated arrival timing) at the traffic light location in a case where the vehicle 10 accelerates from the corrected vehicle speed at the allowable acceleration Ga on the basis of the distance between the vehicle 10 and the traffic light location, the corrected vehicle speed, and the allowable acceleration Ga, and obtains the condition of the traffic light at the predicted accelerated arrival timing as the light condition Sa on the basis of the predicted accelerated arrival timing and the light cycle information. Next, prediction of the light condition Sb upon arrival at the traffic light location taking into consideration the allowable deceleration Gb will be described. The target vehicle speed control unit 20a predicts an arrival timing (a decelerated arrival timing) at the traffic light in a case where the vehicle 10 decelerates from the corrected vehicle speed at the allowable deceleration Gb on the basis of the distance between the vehicle 10 and the traffic light location, the corrected vehicle speed, and the allowable deceleration Gb, and obtains the condition of the traffic light at the predicted decelerated arrival timing as the light condition Sb on the basis of the predicted decelerated arrival timing and the light cycle information. Here, the allowable acceleration Ga and the allowable deceleration Gb are set in advance.

After predicting the light conditions Sa, Sb in Step S56, the target vehicle speed control unit 20a determines in Step S58 whether or not a passage region exists within the light condition between the light condition Sa and the light condition S. Here, the light condition between the light condition Sa and the light condition S is a light condition extending from the light condition Sa up to the light condition S. In other words, the light condition extending from the light condition Sa up to the light condition S is a light condition of a time period extending from the accelerated arrival timing to the normal arrival timing. Further, the passage region is a region in which the light condition corresponds to a green light condition. Hence, the target vehicle speed control unit 20a determines whether or not a time period in which the light color of the traffic light upon arrival at the traffic light location is green exists within the light condition extending from the light condition Sa up to the light condition S.

After determining in Step S58 that a passage region exists within the light condition between the light condition Sa and the light condition S (Yes), the target vehicle speed control unit 20a advances to Step S62. After determining in Step S58 that a passage region does not exist within the light condition between the light condition Sa and the light condition S (No), the target vehicle speed control unit 20a determines in Step S60 whether or not a passage region exists in a light condition between the light condition S and the light condition Sb. Here, the light condition between the light condition S and the light condition Sb is a light condition extending from the light condition S up to the light condition Sb. In other words, the light condition extending from the light condition S up to the light condition Sb is a light condition of a time period extending from the normal arrival timing to the decelerated arrival timing. Hence, the target vehicle speed control unit 20a determines whether or not a time period in which the light color of the traffic light upon arrival at the traffic light location is green exists within the light condition extending from the light condition S up to the light condition Sb.

After determining in Step S60 that a passage region exists in the light condition between the light condition S and the light condition Sb (Yes), the target vehicle speed control unit 20a advances to Step S62. After determining Yes in Step S58 or Yes in Step S60, the target vehicle speed control unit 20a determines that passage assistance is possible in Step S62, and then terminates the processing. Having determined in Step S60 that a passage region does not exist in the light condition between the light condition S and the light condition Sb (No), on the other hand, the target vehicle speed control unit 20a determines that stopping assistance is required in Step S64, and then terminates the processing.

Here, using FIG. 9, a relationship between the processing shown in FIG. 8 and the light color of the traffic light at the predicted arrival time will be described. A light cycle 70 shown in FIG. 9 illustrates the light color of the traffic light at the predicted arrival time. In the light cycle 70, the light color changes from green to yellow, from yellow to red, and from red to green. Further, passage regions Ea, Eb of the light cycle 70 are time regions where the color of the light is green, a time remaining before the light color changes from green to red equals or exceeds a predetermined time, and an elapsed time following a change in the light color to green equals or exceeds a predetermined time. In other words, the target vehicle speed control unit 20a sets time periods where the light color is green, excluding predetermined times at the start and end of the green period, as the passage regions Ea, Eb. Note that although the light cycle 70 advances from left to right over time, the relationship between the processing shown in FIG. 8 and the light color of the traffic light at the predicted arrival time is illustrated schematically, and therefore a temporal axis of the light cycle 70 is not fixed.

Further, a predicted pattern 72a and a predicted pattern 72b shown in FIG. 9 are prediction results of the arrival time at the traffic light location in cases where the pass/stop determination is performed at respective timings. In the predicted pattern 72a, the normal arrival timing following travel at the corrected vehicle speed is indicated by an arrow 74a, and the light condition at the normal arrival timing corresponds to the light condition S, pointed by the arrow 74a. The accelerated arrival timing after accelerating from the corrected vehicle speed at the acceleration Ga is indicated by an arrow 76a, and the light condition at the accelerated arrival timing corresponds to the light condition Sa, pointed by the arrow 76a. Further, the decelerated arrival timing after decelerating from the corrected vehicle speed at the deceleration Gb is indicated by an arrow 78a, and the light condition at the decelerated arrival timing corresponds to the light condition Sb, pointed by the arrow 78a. Similarly, in the predicted pattern 72b, the normal arrival timing following travel at the corrected vehicle speed is indicated by an arrow 74b, and the light condition at the normal arrival timing corresponds to the light condition S, pointed by the arrow 74b. The accelerated arrival timing after accelerating from the corrected vehicle speed at the acceleration Ga is indicated by an arrow 76b, and the light condition at the accelerated arrival timing corresponds to the light condition Sa, pointed by the arrow 76b. Further, the decelerated arrival timing after decelerating from the corrected vehicle speed at the deceleration Gb is indicated by an arrow 78b, and the light condition at the decelerated arrival timing corresponds to the light condition Sb, pointed by the arrow 78b.

The target vehicle speed control unit 20a performs the pass/stop determination through the processing shown in FIG. 8. For example, when the target vehicle speed control unit 20a performs the pass/stop determination at a timing of the predicted pattern 72a, a partial region 80 of the light condition between the light condition Sa and the light condition S overlaps the passage region Ea. Hence, the target vehicle speed control unit 20a determines Yes in Step S58, and therefore determines that passage assistance is possible. Note that the target vehicle speed control unit 20a preferably calculates a vehicle speed region corresponding to the region 80 as the target vehicle speed region.

Further, when the target vehicle speed control unit 20a performs the pass/stop determination at a timing of the predicted pattern 72b, the light condition between the light condition Sa and the light condition S does not overlap either passage region Ea, Eb, but a partial region 82 of the light condition between the light condition S and the light condition Sb overlaps the passage region Eb. Hence, the target vehicle speed control unit 20a determines No in Step S58 but determines Yes in Step S60, and therefore determines that passage assistance is possible. Note that the target vehicle speed control unit 20a preferably calculates a vehicle speed region corresponding to the region 82 as the target vehicle speed region.

Hence, the driving assistance apparatus 19 performs the pass/stop determination processing through the processing shown in FIG. 8. More specifically, as shown in FIG. 9, the driving assistance apparatus 19 obtains the predicted patterns 72a, 72b by predicting, at the time of the pass/stop determination, the light conditions S, Sa, Sb in a case where the vehicle 10 travels at the corrected vehicle speed, a case in which the vehicle 10 accelerates from the corrected vehicle speed at the allowable acceleration Ga, and a case in which the vehicle 10 decelerates from the corrected vehicle speed at the allowable deceleration Gb, respectively. By using the predicted patterns 72a, 72b, the driving assistance apparatus 19 can predict the light condition within a time range extending from a case in which the vehicle 10 accelerates from the corrected vehicle speed at the allowable acceleration Ga so as to arrive at the traffic light location at an earliest timing from among the set conditions to a case in which the vehicle 10 decelerates from the corrected vehicle speed at the allowable deceleration Gb so as to arrive at the traffic light location at a latest timing from among the set conditions. Further, by determining whether or not the predicted patterns 72a, 72b overlap the passage regions Ea, Eb, the driving assistance apparatus 19 can determine whether or not the light condition will include the green light condition when the vehicle 10 arrives at the traffic light location in a manner that satisfies the set condition.

By performing the pass/stop determination on the basis of the processing shown in FIG. 8, the driving assistance apparatus 19 can perform the passage assistance in a case where the light color of the traffic light is green when the vehicle 10 arrives at the traffic light location after accelerating from the corrected vehicle speed at a predetermined acceleration (allowable acceleration Ga) or decelerating from the corrected vehicle speed at predetermined deceleration (allowable deceleration Gb). In other words, when excessive acceleration or deceleration from the corrected vehicle speed is required, the driving assistance apparatus 19 determines that the vehicle 10 may not pass through the traffic light location. Accordingly, the driving assistance apparatus 19 does not display a target vehicle speed region of passage assistance requiring speed variation by an amount of acceleration exceeding the allowable acceleration Ga or an amount of deceleration exceeding the allowable deceleration Gb as the target vehicle speed region. As a result, the driving assistance apparatus 19 can prevent display of a target vehicle speed region requiring rapid acceleration or deceleration, and therefore target vehicle speed regions that are unlikely to cause the driver to feel discomfort or stress can be displayed. Further, since travel can be performed in the target vehicle speed region by accelerating or decelerating within an appropriate range, the driver can drive the vehicle 10 under a favorable condition (in this embodiment, stopping less frequently at red lights) while maintaining a comfortable driving condition. Note, however, that when the driving assistance apparatus 19 determines that stopping assistance is required, the driving assistance 19 may display a target vehicle speed region requiring an amount of deceleration exceeding the allowable deceleration Gb in order to stop the vehicle before the traffic light location.

Further, in a case where it is possible to pass through the traffic light location by accelerating or decelerating within the predetermined range, the passage assistance can be performed favorably, and therefore a more favorable target vehicle speed region can be displayed to the driver. Moreover, the driver is less likely to suspect that it was possible to pass through the traffic light location by accelerating or decelerating within the predetermined range, and therefore the passage assistance can be performed in a manner that is unlikely to cause the driver to feel a sense of distrust therein.

The driving assistance apparatus 19 preferably calculates the target vehicle speed region on the basis of the relationship between the obtained predicted patterns 72a, 72b and the passage regions Ea, Eb. In other words, the driving assistance apparatus 19 determines and displays the target vehicle speed region on the basis of the corrected vehicle speed and the predetermined acceleration and the predetermined deceleration. To put it another way, the driving assistance apparatus 19 does not calculate a vehicle speed region requiring excessive acceleration or deceleration from the corrected vehicle speed as the target vehicle speed region displayed in the vehicle speed display region 48. As a result, display of a target vehicle speed region requiring rapid acceleration or deceleration can be suppressed even more reliably, and therefore target vehicle speed regions that are unlikely to cause the driver to feel discomfort or stress can be displayed. Further, since travel can be performed in the target vehicle speed region by accelerating or decelerating within an appropriate range, the driver can drive the vehicle 10 under a favorable condition (in this embodiment, stopping less frequently at red lights) while maintaining a comfortable driving condition.

The driving assistance apparatus 19 preferably performs the pass/stop determination by predicting the light condition for both the case in which the vehicle 10 accelerates from the corrected vehicle speed at the allowable acceleration Ga and the case in which the vehicle 10 decelerates from the corrected vehicle speed at the allowable deceleration Gb and obtaining the corresponding predicted pattern. However, the driving assistance apparatus 19 may obtain the predicted pattern by predicting the light condition in only one of these cases. In other words, the driving assistance apparatus 19 may predict the light condition S when the vehicle 10 travels at the corrected vehicle speed and the light condition Sa when the vehicle 10 accelerates from the corrected vehicle speed at the allowable acceleration Ga, and perform the pass/stop determination on the basis of a relationship between the passage region and the light condition between the light condition Sa and the light condition S. Similarly, the driving assistance apparatus 19 may predict the light condition S when the vehicle 10 travels at the corrected vehicle speed and the light condition Sb when the vehicle 10 decelerates from the corrected vehicle speed at the allowable deceleration Gb, and perform the pass/stop determination on the basis of a relationship between the passage region and the light condition between the light condition S and the light condition Sb.

The driving assistance apparatus 19 preferably first compares the light condition when the vehicle 10 accelerates at the predetermined acceleration to the passage region and then the driving assistance apparatus 19 compares the light condition when the vehicle 10 decelerates at the predetermined deceleration to the passage region. By first comparing the light condition when the vehicle 10 accelerates at the predetermined acceleration to the passage region, the driving assistance apparatus 19 prioritizes calculation of the target vehicle speed region when the vehicle 10 accelerates at the predetermined acceleration. Hence, by having the driving assistance apparatus 19 compare the light condition when the vehicle 10 accelerates at the predetermined acceleration to the passage region first, the vehicle 10 can pass through the traffic light location more quickly.

The driving assistance apparatus 19 may reverse the order of Step S58 and Step S60 in the processing shown in FIG. 8. Further, the driving assistance apparatus 19 may determine the order of Step S58 and Step S60 in the processing shown in FIG. 8 on the basis of various conditions. For example, the driving assistance apparatus 19 may determine the presence of a vehicle ahead using the in-vehicle camera 34, a millimeter wave radar, or the like, and execute the processing of Step S60 before the processing of Step S58 when a vehicle exists in a nearby position ahead but execute the processing of Step S58 before the processing of Step S60 when a vehicle does not exist in a nearby position ahead. Furthermore, the driving assistance apparatus 19 may perform processing to calculate both the target vehicle speed region when the vehicle 10 accelerates and the target vehicle speed region when the vehicle 10 decelerates, and display the target vehicle speed region that is closer to the corrected vehicle speed as a calculation result. The driving assistance apparatus 19 may also perform processing to calculate both the target vehicle speed region when the vehicle 10 accelerates and the target vehicle speed region when the vehicle 10 decelerates, and display both target vehicle speed regions.

As shown in FIG. 9, the driving assistance apparatus 19 sets, as the passage region Ea, Eb, a region extending from the elapse of the predetermined time following a change in the display condition of the traffic light from a display condition (a red light, for example) indicating that vehicle passage is not permitted to a display condition (a green light, for example) indicating that vehicle passage is permitted up to a time point preceding, by the predetermined time, a change in the display condition of the traffic light from the display condition (the green light, for example) indicating that vehicle passage is permitted to the display condition (the red light, for example) indicating that vehicle passage is not permitted. The driving assistance apparatus 19 then calculates a vehicle speed region in which the vehicle is to pass through the traffic light location within the passage region Ea, Eb as the target vehicle speed region.

Hence, the driving assistance apparatus 19 sets a vehicle speed region in which the time remaining to a change in the light color from green to red equals or exceeds the predetermined time as the target vehicle speed region. In so doing, the vehicle can pass through the traffic light location before a change in the light color to red even when the vehicle decelerates to a vehicle speed below the target vehicle speed region during actual travel such that slightly more time is required to reach the traffic light location. Further, the driving assistance apparatus 19 sets a vehicle speed region in which the time following a change in the light color to green equals or exceeds the predetermined time as the target vehicle speed region, and therefore the light color of the traffic light changes from red to green at a point having a given distance to the traffic light location. As a result, the vehicle can be prevented from approaching the traffic light while the light color is still red. Hence, a situation in which the driver is uncertain whether the light color will change and therefore considers decelerating can be suppressed, and the driver can thus be prevented from feeling a sense of discomfort.

The driving assistance apparatus 19 preferably adjusts and determines the predetermined time used during calculation of the target vehicle speed region, or in other words a time not subject to target vehicle speed region calculation within the time during which the light color is green at the predicted arrival time at the traffic light location, in accordance with the distance between the vehicle and the traffic light location. In so doing, processing can be executed favorably in accordance with the distance between the vehicle and the traffic light location.

The driving assistance apparatus 19 preferably adjusts and determines the allowable acceleration Ga and the allowable deceleration Gb used in the pass/stop determination in accordance with the distance between the vehicle and the traffic light location. In so doing, the driving assistance apparatus 19 can modify the reference used in the pass/stop determination in accordance with the distance between the vehicle and the traffic light location, and can therefore perform the pass/stop determination more appropriately. More specifically, the allowable acceleration Ga and allowable deceleration Gb are preferably reduced as the distance between the vehicle and the traffic light location increases and increased as the distance between the vehicle and the traffic light location decreases. Thus, the possibility of calculating a target vehicle speed region that cannot be realized in reality due to an excessive amount of required acceleration can be reduced.

The driving assistance apparatus 19 preferably adjusts and determines the allowable acceleration Ga and the allowable deceleration Gb used in the pass/stop determination in accordance with the current light color of the traffic light. The driving assistance apparatus 19 may modify the allowable acceleration Ga to a smaller value and modify the allowable deceleration Gb to a larger value when the current light color of the traffic light is red, for example. Further, the driving assistance apparatus 19 may modify the allowable acceleration Ga to a larger value and modify the allowable deceleration Gb to a smaller value when the current light color of the traffic light is green, for example. Thus, in a case where the light color of the traffic light located ahead is red, the predicted pattern is more likely to overlap a passage region occurring when the light subsequently turns green, and therefore the driving assistance apparatus 19 can calculate the vehicle speed required by the vehicle 10 to pass through the traffic light location without stopping more reliably. When the light color of the traffic light located ahead is green, on the other hand, the predicted pattern is more likely to overlap a passage region including the current light condition in which the green light is illuminated, and therefore the driving assistance apparatus 19 can calculate the vehicle speed required by the vehicle 10 to pass through the traffic light location without stopping more reliably. Note that 0.1 G and 0.3 G (−0.3 G) may be cited as examples of reference values of the allowable acceleration Ga and the allowable deceleration Gb, respectively.

The driving assistance apparatus 19 according to this embodiment displays a target vehicle speed region of 0 km/h as the stopping assistance, but is not limited thereto. Instead, the driving assistance apparatus 19 may display no target vehicle speed region when the passage assistance is not possible.

The driving assistance apparatus 19 according to this embodiment calculates the target vehicle speed region on the basis of a region in which the light condition between the light condition when the vehicle 10 accelerates and the light condition when the vehicle 10 decelerates overlaps the passage region, but may calculate the target vehicle speed region using various references. The driving assistance apparatus 19 may determine an upper limit vehicle speed of the target vehicle speed region on the basis of the light condition Sa. In so doing, a vehicle speed that can be realized at the allowable acceleration Ga can be set as the upper limit vehicle speed of the target vehicle speed region. Alternatively, the driving assistance apparatus 19 may calculate the upper limit vehicle speed of the target vehicle speed region on the basis of an earliest timing of the passage region Ea overlapping the predicted pattern 72a. In this case, the upper limit vehicle speed of the target vehicle speed region tends to increase, and therefore a separate upper limit vehicle speed threshold may be provided. Further, a vehicle speed that is higher than the current vehicle speed by the first vehicle speed α, i.e. the corrected vehicle speed described above, may be set as the upper limit vehicle speed threshold, for example.

The upper limit vehicle speed of the target vehicle speed region is not limited to a vehicle speed that is higher than the current vehicle speed by the first vehicle speed α. Further, the reference speed for determining whether or not the passage assistance is possible may also be set using various references, similarly to the upper limit vehicle speed of the target vehicle speed region.

The driving assistance apparatus 19 may determine the lower limit vehicle speed of the target vehicle speed region on the basis of the light condition Sb. In so doing, a vehicle speed that can be realized at the allowable deceleration Gb can be set as the lower limit vehicle speed of the target vehicle speed region. Alternatively, the driving assistance apparatus 19 may calculate the lower limit vehicle speed of the target vehicle speed region on the basis of a latest timing of the passage region Eb overlapping the predicted pattern 72b. In this case, the lower limit vehicle speed of the target vehicle speed region decreases, and therefore separate lower limit vehicle speed thresholds may be provided, similarly to the upper limit vehicle speed.

The driving assistance apparatus 19 preferably displays the mark of the target vehicle speed region in the vehicle speed display region in different colors during the passage assistance and the stopping assistance. Note that the mark may be displayed in different patterns, different illumination conditions, and so on rather than in different colors. In so doing, the driver can immediately recognize whether the target vehicle speed region of the passage assistance or the target vehicle speed region of the stopping assistance is being displayed.

Figure 10:
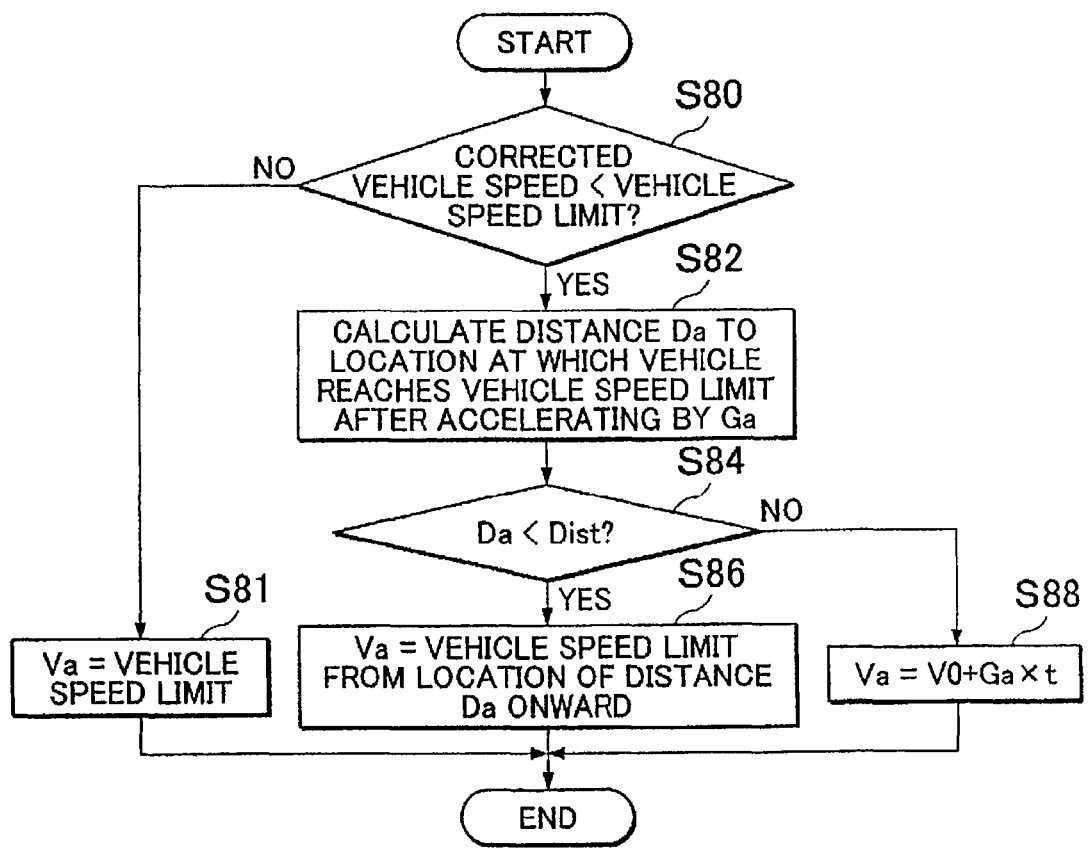
FIG. 10 is a flowchart showing another example of the processing performed by the driving assistance apparatus.
Figure 11:
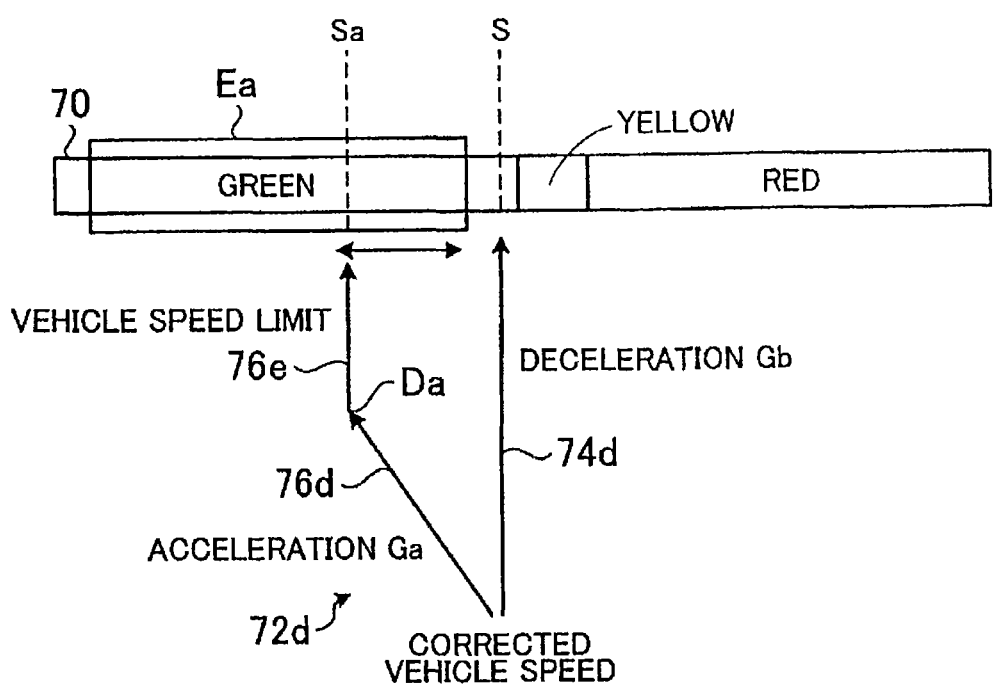
FIG. 11 is an illustrative view illustrating an example of the processing performed by the driving assistance apparatus.

The driving assistance apparatus 19 according to the above embodiment preferably takes into consideration the vehicle speed limit of the road on which the vehicle is traveling when obtaining the predicted pattern during the pass/stop determination. The vehicle speed limit is a legal vehicle speed limit of the road on which the vehicle is currently traveling, for example. The vehicle speed limit may also be obtained from the infrastructure information using the infrastructure communication unit 38. Alternatively, the current position may be detected from the GPS signals received by the GPS communication unit 32, and the vehicle speed limit may be obtained from the information stored in the map information database 22a on the basis of the detected current position. The driving assistance apparatus 19 may use a combination of the infrastructure communication unit 38, the GPS communication unit 32, and the map information database 22a as an information acquisition unit for obtaining vehicle speed limit information. Another function of the driving assistance apparatus 19, for example the in-vehicle camera 34, may also be used as the information acquisition unit for obtaining the vehicle speed limit information. The driving assistance apparatus 19 may obtain an image of a sign disposed on the road along which the vehicle is traveling using the in-vehicle camera 34, and obtain the legal vehicle speed limit indicated by the image of the sign as the vehicle speed limit. FIG. 10 is a flowchart showing another example of the processing performed by the driving assistance apparatus. FIG. 11 is an illustrative view illustrating an example of the processing performed by the driving assistance apparatus. Here, the processing shown in FIG. 10 is executed as a part of the processing of Step S16 in FIG. 4. The processing shown in FIG. 10 is processing for determining a vehicle speed condition (an upper limit corrected vehicle speed Va) used during prediction of the light condition Sa.

As shown in FIG. 10, in Step S80, the target vehicle speed control unit 20a of the driving assistance apparatus 19 determines whether or not the corrected vehicle speed is lower than the vehicle speed limit. Having determined in Step S80 that the corrected vehicle speed is not lower than the vehicle speed limit (No), the target vehicle speed control unit 20a sets the upper limit corrected vehicle speed Va at the vehicle speed limit in Step S81, and then terminates the processing. Hence, when the corrected vehicle speed equals or exceeds the vehicle speed limit, the target vehicle speed control unit 20a predicts a light condition at the predicted arrival time at the traffic light location following travel at the vehicle speed limit, rather than the corrected vehicle speed taking into account the allowable acceleration Ga, as the light condition Sa.

Having determined in Step S80 that the corrected vehicle speed is lower than the vehicle speed limit (Yes), the target vehicle speed control unit 20a calculates, in Step S82, a distance Da from the current position to a vehicle speed limit reaching location at which the vehicle 10 reaches the vehicle speed limit after accelerating at the allowable acceleration Ga, and determines in Step S84 whether or not the distance Da is smaller than a distance Dist. Here, the distance Dist is a distance from the current position to the traffic light location.

Having determined in Step S84 that the distance Da is smaller than the distance Dist (Yes), the target vehicle speed control unit 20a sets the vehicle speed limit as the upper limit corrected vehicle speed Va from the vehicle speed limit reaching location onward in Step S86, and then terminates the processing. Hence, when the distance Da is smaller than the distance Dist, the target vehicle speed control unit 20a obtains a predicted pattern 72d shown in FIG. 11. In the predicted pattern 72d, a light condition at the predicted arrival time when the vehicle travels to the traffic light location after accelerating at the allowable acceleration Ga up to the vehicle speed limit reaching location (a location moved from the current position by the distance Da), as shown by an arrow 76d, and then travels at the vehicle speed limit from the vehicle speed limit reaching location onward, as show by an arrow 76e, is set as the light condition Sa. Further, a light condition at the predicted arrival time when the vehicle travels at the current vehicle speed is set as the light condition S.

Having determined in Step S84 that the distance Da is not smaller than the distance Dist (No), the target vehicle speed control unit 20a sets the upper limit corrected vehicle speed Va at a vehicle speed obtained by adding a current vehicle speed V0 to a product of the allowable acceleration Ga and a time t (Va=V0+Ga×t) in Step S88, and then terminates the processing. In other words, when the distance Da is not smaller than the distance Dist, the target vehicle speed control unit 20a sets as the light condition Sa the light condition at the predicted arrival time when the vehicle travels up to the traffic light location after accelerating by the allowable acceleration Ga.

As shown in FIGS. 10 and 11, the driving assistance apparatus 19 predicts the light condition Sa taking into account the vehicle speed limit, and performs the pass/stop determination using the predicted light condition Sa and the light condition S predicted using the current vehicle speed. Accordingly, a situation in which a target vehicle speed region including a vehicle speed at which the vehicle 10 cannot travel due to regulations is displayed can be suppressed. As a result, the driver can be prevented from feeling unnecessary stress.

Figure 12:
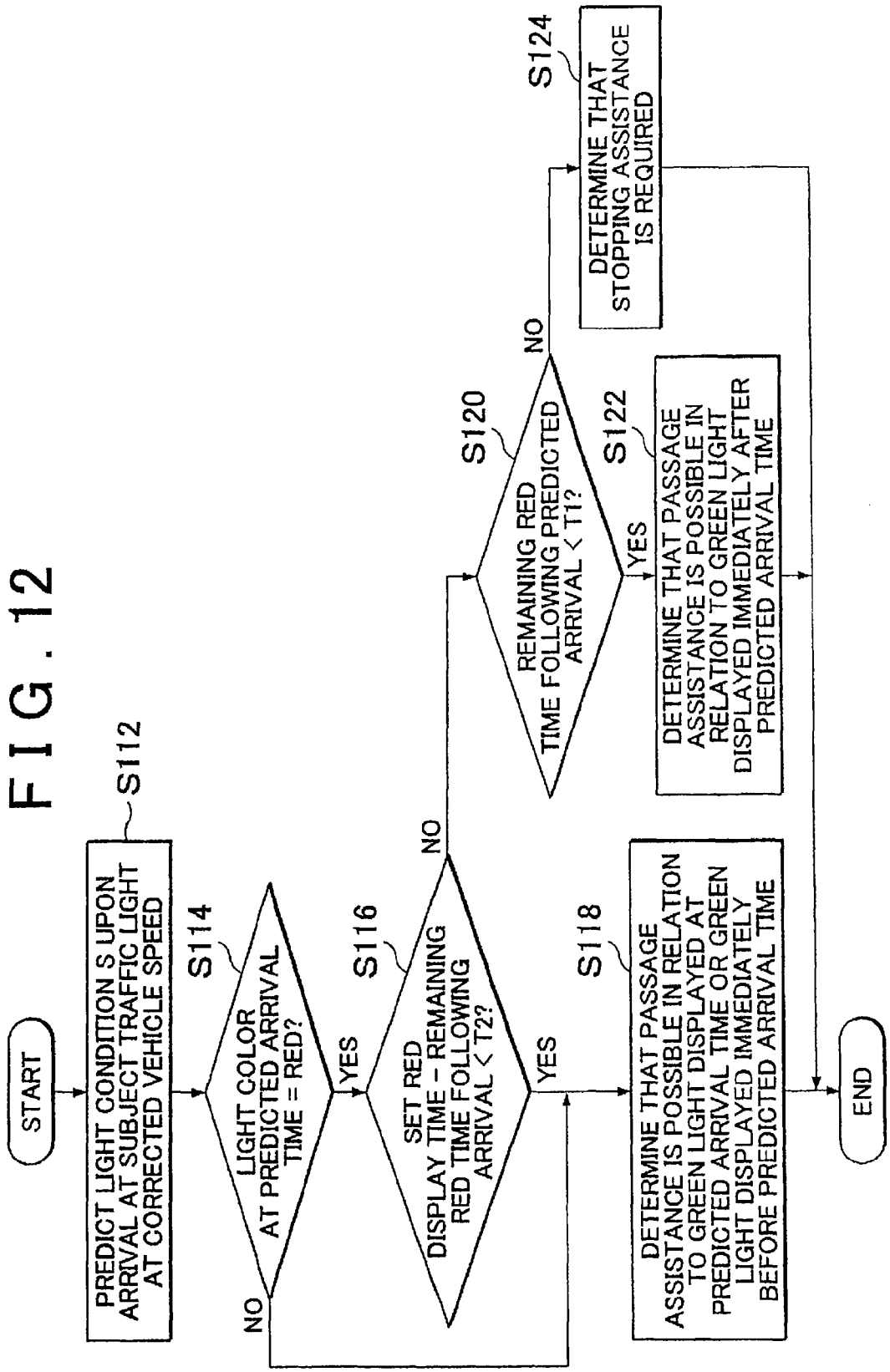
FIG. 12 is a flowchart showing an example of the processing performed by the driving assistance apparatus.
Figure 13:
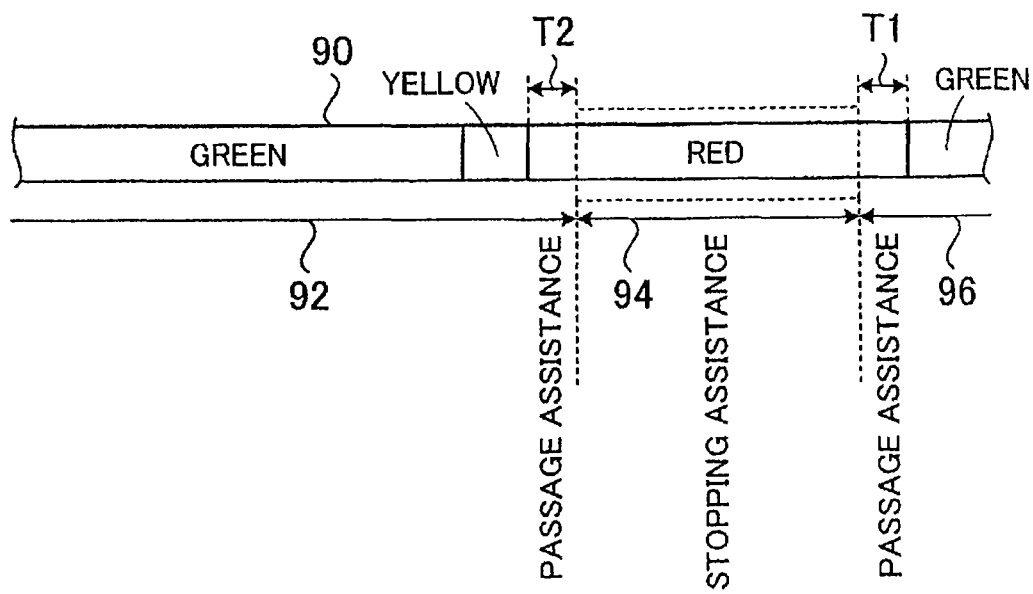
FIG. 13 is an illustrative view illustrating an example of determination processing performed during a pass/stop determination.

Next, using FIGS. 12 and 13, the control executed by the target vehicle speed control unit 20a in the ECU 20 of the vehicle 10 will be described in further detail. FIG. 12 is a flowchart showing an example of the processing performed by the driving assistance apparatus, and FIG. 13 is an illustrative view illustrating an example of the processing performed during the pass/stop determination.

In Step S112, the target vehicle speed control unit 20a predicts the light condition S upon arrival at the subject traffic light location at the corrected vehicle speed. More specifically, the target vehicle speed control unit 20a predicts the arrival timing at the traffic light on the basis of the distance between the vehicle 10 and the subject traffic light 12, 12a, or more precisely the distance between the vehicle 10 and the traffic light location (intersection or pedestrian crossing) where the traffic light is disposed, and the corrected vehicle speed, and sets the light condition at the predicted timing as the light condition S on the basis of the predicted arrival timing and the light cycle information. Here, the light condition S includes the light color of the traffic light upon arrival, the display time of the displayed light color (the elapsed time from the start of display), and the time remaining until the traffic light changes to the next light color (the remaining display time of the light color).

After predicting the light condition S upon arrival in Step S112, the target vehicle speed control unit 20a determines in Step S114 whether or not the light color of the traffic light at the predicted arrival time is red, or in other words whether or not the light condition S corresponds to a red light condition. After determining in Step S114 that the light color of the traffic light is not red (No), the target vehicle speed control unit 20a advances to Step S118.

After determining in Step S114 that the light color of the traffic light at the predicted arrival time is red (Yes), the target vehicle speed control unit 20a determines in Step S116 whether or not a time obtained by subtracting the remaining time of the red light following arrival from a set display time of the red light is shorter than a second threshold time T2. In other words, when the light color of the traffic light at the predicted arrival time is red, the target vehicle speed control unit 20a determines whether or not an elapsed time following a change in the light color of the traffic light to red is shorter than the second threshold time T2 at the time of arrival. Having determined in Step S116 that the time obtained by subtracting the remaining time of the red light following arrival from the set display time of the red light is shorter than the second threshold time T2 (Yes), the target vehicle speed control unit 20a advances to Step S118.

When No is determined in Step S114 or Yes is determined in Step S116, or in other words when the light color of the traffic light at the predicted arrival time is green or the light color of the traffic light at the predicted arrival time is red and the elapsed time following the change in the light color of the traffic light to red is shorter than the second threshold time T2, the target vehicle speed control unit 20a determines in Step S118 that passage assistance can be performed in relation to the green light displayed at the predicted arrival time or a green light displayed immediately before the red light displayed at the predicted arrival time. More specifically, when the light color of the traffic light at the predicted arrival time is green, the target vehicle speed control unit 20a determines that the vehicle 10 may pass within the period of the green light displayed at the predicted arrival time. When the light color of the traffic light at the predicted arrival time is red and the elapsed time following the change in the light color of the traffic light to red is shorter than the second threshold time T2, the target vehicle speed control unit 20a determines that the vehicle 10 may pass through the green light displayed immediately before the red light that will be displayed at the predicted arrival time. After determining that the passage assistance is possible in Step S118, the target vehicle speed control unit 20a terminates the pass/stop determination processing.

Further, after determining in Step S116 that the time obtained by subtracting the remaining time of the red light following arrival from the set display time of the red light is not shorter than the second threshold time T2 (No), the target vehicle speed control unit 20a determines in Step S120 whether or not a remaining time of the red light following the predicted arrival is shorter than a first threshold time T1. In other words, when the light color is red, the target vehicle speed control unit 20a determines whether or not a time remaining until the light color of the traffic light changes from red to the next color (a light color indicating that vehicles is permitted to pass, basically green) is shorter than the first threshold time T1 at the time of arrival. Having determined in Step S120 that the remaining time of the red light following the predicted arrival is shorter than the first threshold time T1 (Yes), the target vehicle speed control unit 20a determines in Step S122 that passage assistance can be performed in relation to the green light to be displayed immediately after the red light displayed at the predicted arrival time. More specifically, when the light color of the traffic light at the predicted arrival time is red and the time remaining until the light color of the traffic light changes to green is shorter than the first threshold time T1, the target vehicle speed control unit 20a determines that the vehicle 10 is permitted to pass through the green light to be displayed after the red light displayed at the predicted arrival time. After determining that the passage assistance is possible in Step S122, the target vehicle speed control unit 20a terminates the pass/stop determination processing.

After determining in Step S120 that the remaining time of the red light following the predicted arrival time is not shorter than the first threshold time T1 (No), the target vehicle speed control unit 20a determines in Step S124 that the stopping assistance is required. After determining that the stopping assistance is required in Step S124, the target vehicle speed control unit 20a terminates the pass/stop determination processing.

Next, using FIG. 13, a relationship between the pass/stop determination processing shown in FIG. 12 and the light color of the traffic light at the predicted arrival time will be described. A light cycle 90 shown in FIG. 13 illustrates the light color of the traffic light at the predicted arrival time, similarly to the light cycle shown in FIG. 9. Note that in the processing shown in FIG. 12, the yellow light is assumed to be included in the green light. By performing the pass/stop determination in the processing shown in FIG. 12, the target vehicle speed control unit 20a determines that the passage assistance is required when the predicted arrival time is included within a region 92 or a region 96, and determines that the stopping assistance is required when the predicted arrival time is included within a region 94. Here, the region 92 includes a case in which the light color is green or yellow and a case in which the time following a change in the light color to red is shorter than the second threshold time T2. The region 96 includes a case in which the light color is red and the time remaining until the light color changes from red to green is shorter than the first threshold time T1, and a case in which the light color is green following red. Further, the region 94 includes a case in which the light color is red and the time following the change in the light color to red equals or exceeds the second threshold time T2, and a case in which the time remaining until the light color changes from red to green equals or exceeds the first threshold time T1.

As shown in FIGS. 12 and 13, the target vehicle speed control unit 20a performs the passage assistance in the region 92. As a result, the passage assistance can be performed in a case where the light color upon arrival at the traffic light location will be red if the vehicle 10 travels at the corrected vehicle speed but green if the vehicle 10 accelerates from the corrected vehicle speed. Further, as shown in FIGS. 12 and 13, the target vehicle speed control unit 20a performs the passage assistance in the region 96. As a result, the passage assistance can be performed in a case where the light color upon arrival at the traffic light location will be red if the vehicle 10 travels at the corrected vehicle speed but green if the vehicle 10 decelerates from the corrected vehicle speed.

Further, by executing the pass/stop determination on the basis of the processing shown in FIGS. 12 and 13, the driving assistance apparatus 19 can perform the passage assistance in a case where the light color upon arrival at the traffic light location will be red if the vehicle 10 travels at the corrected vehicle speed but green if the vehicle 10 decelerates from the corrected vehicle speed. Hence, the passage assistance can be performed favorably in a case where the vehicle 10 is permitted to pass through the traffic light location by decelerating within a predetermined range, and therefore a more favorable target vehicle speed region can be displayed to the driver. Moreover, the driver can be prevented from suspecting that it would have been possible to pass through the traffic light location by decelerating slightly more, and therefore the passage assistance can be performed in a manner that is unlikely to cause the driver to feel a sense of distrust therein.

By executing the pass/stop determination on the basis of the processing shown in FIGS. 12 and 13, the driving assistance apparatus 19 can execute the pass/stop determination on the basis of the corrected vehicle speed, the light cycle information, and the predicted arrival time. As a result, the pass/stop determination can be performed through simple processing.

Further, the driving assistance apparatus 19 preferably adjusts and determines the first threshold times T1 and the second threshold time T2 used in the pass/stop determination, or in other words times at which the passage assistance is performed even when the light color of the traffic light at the predicted arrival time is red, in accordance with the distance between the vehicle and the traffic light location. In so doing, the driving assistance apparatus 19 can modify the reference of the pass/stop determination in accordance with the distance between the vehicle and the traffic light location, whereby the pass/stop determination can be executed more appropriately. More specifically, the first threshold times T1 and the second threshold time T2 are preferably lengthened as the distance between the vehicle and the traffic light location increases and shortened as the distance between the vehicle and the traffic light location decreases. For example, when the distance between the vehicle and the traffic light location is D, each of the first threshold times T1 and the second threshold time T2 may be determined by multiplying the distance D by a coefficient. In so doing, the first threshold times T1 and the second threshold time T2 can be increased as the distance D increases, and as a result, the time period in which it is determined that the vehicle is permitted to pass through the traffic light location even though the light color of the traffic light at the predicted arrival time is red can be increased. Hence, it is more likely to be determined that the vehicle is permitted to pass through the traffic light location in a situation that the vehicle speed can be adjusted easily, and therefore the vehicle is more likely to be able to pass through the traffic light location without stopping.

Here, similarly to the above description, the driving assistance apparatus 19 preferably calculates, as the target vehicle speed region, a vehicle speed region in which the vehicle is to pass through the traffic light location extending from the elapse of a predetermined time following a change in the display condition of the traffic light from a display condition (a red light, for example) indicating that vehicle passage is not permitted to a display condition (a green light, for example) indicating that passage is permitted up to a time point preceding, by the threshold time, a change in the display condition of the traffic light from the display condition (the green light, for example) indicating that passage is permitted to the display condition (the red light, for example) indicating that passage is not permitted. Hence, the driving assistance apparatus 19 sets the target vehicle speed region within a region in which the time remaining to a change in the light color from green to red equals or exceeds the predetermined time. In so doing, the vehicle can pass through the traffic light before the light color turns red even when the vehicle decelerates to a vehicle speed below the target vehicle speed region during actual travel such that slightly more time is required to reach the traffic light. Further, the driving assistance apparatus 19 sets the target vehicle speed region within a region in which the elapsed time after the light color turns green equals or exceeds the predetermined time, and therefore the light color of the traffic light changes from red to green at a point having a given distance to the traffic light location. As a result, the vehicle can be prevented from approaching the traffic light while the light color is still red. Hence, a situation in which the driver is uncertain whether the light color will change and therefore considers decelerating can be suppressed, and the driver can thus be prevented from feeling a sense of discomfort.

The driving assistance apparatus 19 preferably adjusts and determines the predetermined time used during calculation of the target vehicle speed region, or in other words a time not subject to target vehicle speed region calculation within the time during which the light color at the predicted arrival time is green, in accordance with the distance between the vehicle and the traffic light location. In so doing, processing can be executed favorably in accordance with the distance between the vehicle and the traffic light location, similarly to the first threshold time T1 and the second threshold time T2.

The driving assistance apparatus 19 may calculate the target vehicle speed region using various references. Further, the reference vehicle speed for determining whether or not the passage assistance is possible may be calculated using various references, similarly to the upper limit vehicle speed of the target vehicle speed region. Here, the driving assistance apparatus 19 may set the upper limit vehicle speed of the target vehicle speed region at a vehicle speed obtained by adding the product of the acceleration G and the time t to the corrected vehicle speed. In other words, the driving assistance apparatus 19 may set the upper limit vehicle speed of the target vehicle speed region at a vehicle speed that can be realized at the acceleration G in t seconds. Here, t seconds may take a value that varies on the basis of the distance to the traffic light location and the corrected vehicle speed. For example, the time t may be increased when the distance to the traffic light location is long and reduced when the distance to the traffic light location is short.

Figure 14:
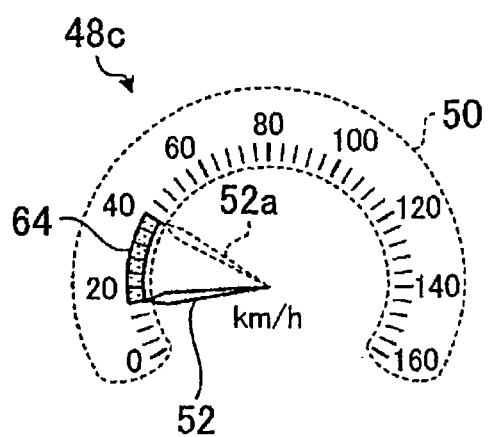
FIG. 14 is a schematic diagram showing an example of the vehicle speed display region of the display device.

Further, the driving assistance apparatus 19 according to this embodiment may set the upper limit vehicle speed of the target vehicle speed region at the corrected vehicle speed. Here, FIG. 14 is a schematic diagram showing an example of the vehicle speed display region of the display device. A vehicle speed display region 48*c* shown in FIG. 14 displays a mark 64 in a vehicle speed region that overlaps the target vehicle speed region in the scale display portion 50. In the vehicle speed display region 48*c* shown in FIG. 14, the upper limit vehicle speed of the target vehicle speed region is set at the corrected vehicle speed. Accordingly, the upper limit of the target vehicle speed region is set at the corrected vehicle speed when the corrected vehicle speed is set at the current speed. In the vehicle speed display region 48*c*, the corrected vehicle speed is 40 km/h, as shown by the needle 52*a*, and therefore the upper limit vehicle speed of the target vehicle speed region is 40 km/h. Further, in the vehicle speed display region 48*c*, the corrected vehicle speed is approximately 10 km/h, as shown by the needle 52. Here, the needle 52*a* is a virtual needle while the needle 52 is visible to the driver. Further, the target vehicle speed region extends from 20 km/h to 40 km/h, and therefore, in the vehicle speed display region 48*c*, the mark 64 is displayed in a vehicle speed region extending from 20 km/h to 40 km/h. By setting the upper limit vehicle speed of the target vehicle speed region at the corrected vehicle speed in this manner, the target vehicle speed control unit 20a can set the target vehicle speed region in a vehicle speed region where excessive acceleration is not required. As a result, the driving assistance apparatus 19 does not recommend a target vehicle speed region requiring excessive acceleration to the driver, and therefore a target vehicle speed region that is unlikely to cause the driver to feel discomfort and stress can be displayed. Note that when the pass/stop determination is performed on the basis of the first threshold time T1 described above, larger acceleration is required to pass through the traffic light location. In this case, the driving assistance apparatus 19 may set the upper limit vehicle speed of the target vehicle speed region at a higher vehicle speed than the corrected vehicle speed.

The driving assistance apparatuses 19 of the above embodiments both determine the upper limit vehicle speed of the target vehicle speed region using the corrected vehicle speed. However, the driving assistance apparatus 19 is not limited thereto, and may use the vehicle speed limit of the road on which the vehicle is traveling as the upper limit vehicle speed of the target vehicle speed region. By using the vehicle speed limit as the upper limit vehicle speed of the target vehicle speed region, the driving assistance apparatus 19 can prevent the target vehicle speed region from exceeding the vehicle speed limit. Accordingly, the driving assistance apparatus 19 can display a vehicle speed region no higher than the vehicle speed limit as the target vehicle speed region, and therefore a situation where a vehicle speed region in which the vehicle 10 is not actually permitted to travel is displayed can be suppressed. As a result, a target vehicle speed region that is unlikely to cause the driver to feel discomfort and stress can be displayed.

The upper limit vehicle speed of the target vehicle speed region is more preferably determined using both the current vehicle speed and the vehicle speed limit. In other words, the driving assistance apparatus 19 preferably ensures that the target vehicle speed region does not exceed the vehicle speed limit when determining the upper limit vehicle speed of the target vehicle speed region. In so doing, the driving assistance apparatus 19 can realize both of the above effects, and as a result, a target vehicle speed region that is unlikely to cause the driver to feel discomfort and stress can be displayed.

The driving assistance apparatus 19 preferably displays the mark of the target vehicle speed region in different colors during the passage assistance and the stopping assistance. Note that the mark may be displayed in different patterns, different illumination conditions, and so on rather than in different colors. In so doing, the driver can immediately recognize whether the target vehicle speed region of the passage assistance or the target vehicle speed region of the stopping assistance is being displayed.

Figure 15:
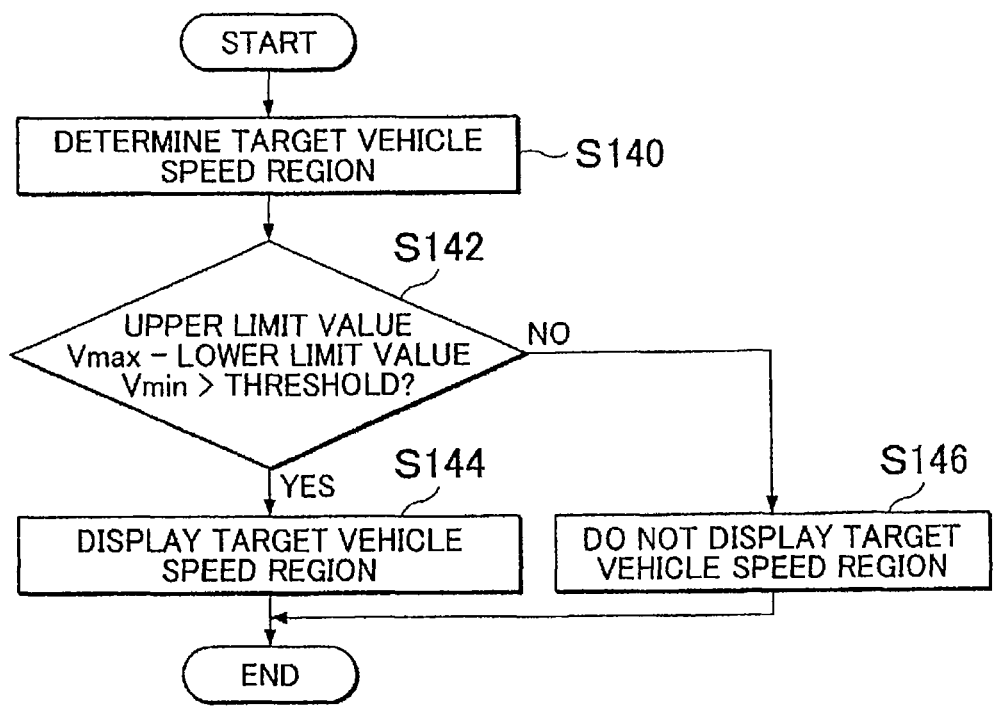
FIG. 15 is a flowchart showing another example of the processing performed by the driving assistance apparatus.

Next, using FIG. 15, another example of the processing performed by the driving assistance apparatus will be described. Here, FIG. 15 is a flowchart showing another example of the processing performed by the driving assistance apparatus. The processing shown in FIG. 15 is executed instead of Step S18 and Step S20 in FIG. 4. In other words, the processing shown in FIG. 15 is executed when Yes is determined in Step S16 of FIG. 4, and when this processing is complete, the routine advances to Step S24.

In Step S140, the target vehicle speed control unit 20a in the ECU 20 of the driving assistance apparatus 19 sets the target vehicle speed region. After setting the target vehicle speed region in Step S140, the target vehicle speed control unit 20a determines in Step S142 whether or not a difference obtained by subtracting a lower limit value Vmin of the target vehicle speed region from an upper limit value Vmax of the target vehicle speed region is larger than a threshold. Having determined in Step S142 that the difference is larger than the threshold (Yes), the target vehicle speed control unit 20a displays the determined target vehicle speed region in the vehicle speed display region in Step S144. Following the processing of Step S144, the target vehicle speed control unit 20a terminates the processing.

Having determined in Step S142 that the difference is not larger than the threshold (No), or in other words that the difference is equal to or smaller than the threshold, the target vehicle speed control unit 20a keeps the set target vehicle speed region from display in Step S146, or in other words does not display the target vehicle speed region in the vehicle speed display region. Following the processing of Step S146, the target vehicle speed control unit 20a terminates the processing.

As shown in FIG. 15, when a vehicle speed difference between the upper limit value and the lower limit value of the target vehicle speed region is equal to or smaller than the threshold, the driving assistance apparatus 19 does not display the target vehicle speed region. As a result, a target vehicle speed region in which the allowable vehicle speed region is narrow such that vehicle speed adjustment is difficult can be kept from display. Thus, the driving assistance apparatus 19 can selectively display target vehicle speed regions in which the allowable vehicle speed region is wide such that speed adjustment is comparatively easy, and therefore target vehicle speed regions that are less likely to cause the driver to feel discomfort and stress can be displayed.

Figure 16:
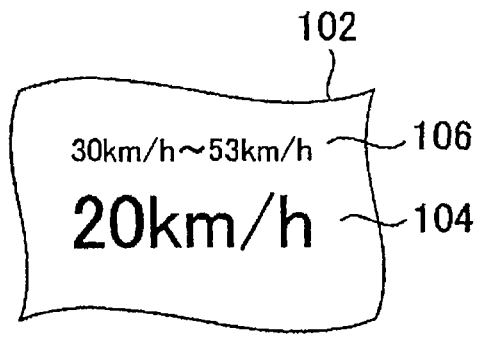
FIG. 16 is a schematic diagram showing another example of the vehicle speed display region of the display device.

Further, in the driving assistance apparatus 19 according to the above embodiments, the vehicle speed display displayed in the vehicle speed display region 48 of the display device 42 is an analog meter, but is not limited thereto, and instead, the vehicle speed display displayed in the vehicle speed display region 48 of the display device 42 of the driving assistance apparatus 19 may be a digital meter. Here, FIG. 16 is a schematic diagram showing another example of the vehicle speed display region of the display device. A vehicle speed display region 102 is a display mechanism that displays vehicle speeds in numerals, and includes a first region 104 and a second region 106. The first region 104 is a region for displaying the current vehicle speed. In the first region 104 in FIG. 16, "20 km/h" is displayed. The second region 106 is a region on an upper side of a screen, above the first region 104, for displaying the target vehicle speed region. In the second region 106 in FIG. 16, "30 km/h-53 km/h" is displayed. Thus, the driving assistance apparatus 19 can obtain similar effects to those described above when the vehicle speed display region 102 of the display device 42 is displayed in the form of a digital meter. Here, the driving assistance apparatus 19 preferably displays the current vehicle speed displayed in the first region 104 of the vehicle speed display region 102 and the target vehicle speed region displayed in the second region 106 in different colors and/or different sizes. In so doing, the driving assistance apparatus 19 can prevent the driver from confusing the current vehicle speed and the target vehicle speed region.

The driving assistance apparatus 19 according to the above embodiments displays the target vehicle speed region by performing processing using the target vehicle speed control unit 20a as a passage assistance control unit. However, the driving assistance apparatus 19 is not limited thereto, and may notify the driver of a recommended travel condition using a control condition other than the target vehicle speed region, i.e. other than the vehicle speed. The driving assistance apparatus 19 may notify the driver of an accelerator depression amount instead of or in addition to the vehicle speed as the passage assistance control unit.

The driving assistance apparatus 19 according to the above embodiments notifies the driver of the target vehicle speed region by displaying the target vehicle speed region in the vehicle speed display region. However, the invention is not limited thereto, and as long as the driving assistance apparatus 19 according to the above embodiments can perform the pass/stop determination, there are no particular limitations on methods of outputting and using the result of the pass/stop determination. The driving assistance apparatus 19 may notify the driver of the result of the pass/stop determination or a recommended travel condition calculated on the basis of the pass/stop determination by voice, control the operating condition automatically on the basis of the result of the pass/stop determination, or control the operating condition automatically so as to realize the recommended travel condition.

What is claimed is:

1. A driving assistance apparatus that assists driving of a vehicle, comprising:
    circuitry configured to:
        calculate relative position information between the vehicle and a traffic light location where a traffic light, disposed in an advancement direction of the vehicle, is disposed;
        detect an operating condition of the vehicle at an intersection location before the traffic light, the intersection location being a location within an immediately preceding predetermined distance of the vehicle to a current position of the vehicle and the operating condition including a right turn or a left turn at the intersection location;
        calculate a corrected vehicle speed on the basis of the operating condition and a current vehicle speed detected by a vehicle speed sensor;
        determine whether or not the vehicle is permitted to pass through the traffic light location on the basis of the corrected vehicle speed, the relative position information between the vehicle and the traffic light location, and traffic light information relating to a change in a display condition of the traffic light;
        when the right turn or the left turn at the intersection location is detected, calculate, as the corrected vehicle speed, a vehicle speed obtained by adding a predetermined vehicle speed to the current vehicle speed; and
        output information corresponding to the determination as to whether or not the vehicle is permitted to pass through the traffic light location to at least one of a display, an audio output, and an automatic operating condition control of the vehicle.

2. The driving assistance apparatus according to claim 1, wherein, when a steering angle, detected by a steering angle sensor, during passage through the intersection location equals or exceeds a steering angle threshold, the circuitry is configured to determine that the right turn or the left turn has been performed at the intersection location.

3. The driving assistance apparatus according to claim 1, wherein:
    the operating condition includes a stop at the intersection location; and
    when a stop at the intersection location is detected, the circuitry is configured to calculate, as the corrected vehicle speed, a vehicle speed obtained by adding a predetermined vehicle speed to the current vehicle speed.

4. The driving assistance apparatus according to claim 1, wherein, when it is determined that a vehicle speed at the intersection location equals or exceeds a vehicle speed threshold, the circuitry is configured to calculate the current vehicle speed as the corrected vehicle speed.

5. The driving assistance apparatus according to claim 1, wherein the intersection location includes a location where a road forks and a location where a stop line is provided.

6. The driving assistance apparatus according to claim 1, wherein:
    when it is determined that the vehicle is permitted to pass through the traffic light location, the circuitry is configured to set a vehicle speed region in which the vehicle is permitted to pass through the traffic light location as a target vehicle speed region; and
    the circuitry is configured to control the notification of the target vehicle speed region.

7. The driving assistance apparatus according to claim 1, wherein the circuitry is configured to determine whether or not the vehicle is permitted to pass through the traffic light location on the basis of at least one of an accelerated corrected vehicle speed generated when the vehicle accelerates from the corrected vehicle speed at an allowable acceleration and a decelerated corrected vehicle speed generated when the vehicle decelerates from the corrected vehicle speed at an allowable deceleration.

8. The driving assistance apparatus according to claim 7, wherein the circuitry is configured to predict an arrival timing at which the vehicle arrives at the traffic light location after traveling at the corrected vehicle speed and an accelerated arrival timing at which the vehicle arrives at the traffic light location after accelerating from the corrected vehicle speed at the allowable acceleration, and determine that the vehicle is permitted to pass through the traffic light location when a permission display period displayed by the traffic light to indicate that the vehicle is permitted to pass through the traffic light location is included between the accelerated arrival timing and the arrival timing.

9. The driving assistance apparatus according to claim 7, wherein the circuitry is configured to predict an arrival timing at which the vehicle arrives at the traffic light location after traveling at the corrected vehicle speed and a decelerated arrival timing at which the vehicle arrives at the traffic light location after decelerating from the corrected vehicle speed at the allowable deceleration, and determine that the vehicle is permitted to pass through the traffic light location when a permission display period displayed by the traffic light to indicate that the vehicle is permitted to pass through the traffic light location is included between the arrival timing and the decelerated arrival timing.

10. The driving assistance apparatus according to claim 1, wherein the circuitry is configured to determine whether or not the vehicle is able to pass through the traffic light location within a permission display period displayed by the traffic light to indicate that the vehicle is permitted to pass through the traffic light location.

11. A driving assistance method that assists driving of a vehicle, comprising:
    detecting a vehicle speed of the vehicle using a vehicle speed sensor;
    obtaining traffic light information relating to a change in a display condition of a traffic light disposed in an advancement direction of the vehicle;
    calculating relative position information between the vehicle and a traffic light location where the traffic light is disposed;
    detecting an operating condition of the vehicle at an intersection location before the traffic light, the intersection location being a location within an immediately preceding predetermined distance of the vehicle to a current position of the vehicle and the operating condition including a right turn or a left turn at the intersection location;

calculating a corrected vehicle speed on the basis of the operating condition and a current vehicle speed detected by the vehicle speed sensor;

determining whether or not the vehicle is permitted to pass through the traffic light location on the basis of the corrected vehicle speed, the relative position information between the vehicle and the traffic light location, and the traffic light information;

when the right turn or the left turn at the intersection location is detected, calculating, as the corrected vehicle speed, a vehicle speed obtained by adding a predetermined vehicle speed to the current vehicle speed; and outputting information corresponding to the determination as to whether or not the vehicle is permitted to pass through the traffic light location to at least one of a display, an audio output, and an automatic operating condition control of the vehicle.

12. A driving assistance apparatus that assists driving of a vehicle, comprising:

circuitry configured to:
calculate relative position information between the vehicle and a traffic light location where a traffic light, disposed in an advancement direction of the vehicle, is disposed;

detect an operating condition of the vehicle at an intersection location before the traffic light, the intersection location being a location within an immediately preceding predetermined distance of the vehicle to a current position of the vehicle and the operating condition including a stop at the intersection location;

calculate a corrected vehicle speed on the basis of the operating condition and a current vehicle speed detected by a vehicle speed sensor;

determine whether or not the vehicle is permitted to pass through the traffic light location on the basis of the corrected vehicle speed, the relative position information between the vehicle and the traffic light location, and traffic light information relating to a change in a display condition of the traffic light;

when the stop at the intersection location is detected, calculate, as the corrected vehicle speed, a vehicle speed obtained by adding a predetermined vehicle speed to the current vehicle speed; and output information corresponding to the determination as to whether or not the vehicle is permitted to pass through the traffic light location to at least one of a display, an audio output, and an automatic operating condition control of the vehicle.

13. The driving assistance apparatus according to claim 12, wherein, when it is determined that a vehicle speed at the intersection location equals or exceeds a vehicle speed threshold, the circuitry is configured to calculate the current vehicle speed as the corrected vehicle speed.

14. The driving assistance apparatus according to claim 12, wherein the intersection location includes a location where a road forks and a location where a stop line is provided.

15. The driving assistance apparatus according to claim 12, wherein:

when it is determined that the vehicle is permitted to pass through the traffic light location, the circuitry is configured to set a vehicle speed region in which the vehicle is permitted to pass through the traffic light location as a target vehicle speed region; and the circuitry is configured to control the notification of the target vehicle speed region.

16. The driving assistance apparatus according to claim 12, wherein the circuitry is configured to determine whether or not the vehicle is permitted to pass through the traffic light location on the basis of at least one of an accelerated corrected vehicle speed generated when the vehicle accelerates from the corrected vehicle speed at an allowable acceleration and a decelerated corrected vehicle speed generated when the vehicle decelerates from the corrected vehicle speed at an allowable deceleration.

17. The driving assistance apparatus according to claim 16, wherein the circuitry is configured to predict an arrival timing at which the vehicle arrives at the traffic light location after traveling at the corrected vehicle speed and an accelerated arrival timing at which the vehicle arrives at the traffic light location after accelerating from the corrected vehicle speed at the allowable acceleration, and determine that the vehicle is permitted to pass through the traffic light location when a permission display period displayed by the traffic light to indicate that the vehicle is permitted to pass through the traffic light location is included between the accelerated arrival timing and the arrival timing.

18. The driving assistance apparatus according to claim 16, wherein the circuitry is configured to predict an arrival timing at which the vehicle arrives at the traffic light location after traveling at the corrected vehicle speed and a decelerated arrival timing at which the vehicle arrives at the traffic light location after decelerating from the corrected vehicle speed at the allowable deceleration, and determine that the vehicle is permitted to pass through the traffic light location when a permission display period displayed by the traffic light to indicate that the vehicle is permitted to pass through the traffic light location is included between the arrival timing and the decelerated arrival timing.

19. The driving assistance apparatus according to claim 12, wherein the circuitry is configured to determine whether or not the vehicle is able to pass through the traffic light location within a permission display period displayed by the traffic light to indicate that the vehicle is permitted to pass through the traffic light location.

20. A driving assistance method that assists driving of a vehicle, comprising:

detecting a vehicle speed of the vehicle using a vehicle speed sensor;

obtaining traffic light information relating to a change in a display condition of a traffic light disposed in an advancement direction of the vehicle;

calculating relative position information between the vehicle and a traffic light location where the traffic light is disposed;

detecting an operating condition of the vehicle at an intersection location before the traffic light, the intersection location being a location within an immediately preceding predetermined distance of the vehicle to a current position of the vehicle and the operating condition including a stop at the intersection location;

calculating a corrected vehicle speed on the basis of the operating condition and a current vehicle speed detected by the vehicle speed sensor;

determining whether or not the vehicle is permitted to pass through the traffic light location on the basis of the corrected vehicle speed, the relative position information between the vehicle and the traffic light location, and the traffic light information;

when the stop at the intersection location is detected, calculating, as the corrected vehicle speed, a vehicle speed obtained by adding a predetermined vehicle speed to the current vehicle speed; and outputting information corresponding to the determination as to whether or not the vehicle is permitted to pass through the traffic light location to at least one of a display, an audio output, and an automatic operating condition control of the vehicle.

* * * * *